US009420061B2

(12) United States Patent
Takahashi et al.

(10) Patent No.: US 9,420,061 B2
(45) Date of Patent: *Aug. 16, 2016

(54) CONTENT DELIVERY SYSTEM

(71) Applicant: NEC CORPORATION, Tokyo (JP)

(72) Inventors: Eiji Takahashi, Tokyo (JP); Satoshi Nogaki, Tokyo (JP); Toru Osuga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/474,400

(22) Filed: Sep. 2, 2014

(65) Prior Publication Data

US 2014/0372573 A1  Dec. 18, 2014

Related U.S. Application Data

(63) Continuation of application No. 13/062,253, filed as application No. PCT/JP2009/003414 on Jul. 22, 2009, now Pat. No. 8,856,903.

(30) Foreign Application Priority Data

Sep. 10, 2008 (JP) ................................. 2008-231759

(51) Int. Cl.
*G06F 21/10* (2013.01)
*H04L 29/08* (2006.01)
(Continued)

(52) U.S. Cl.
CPC .......... *H04L 67/32* (2013.01); *G06F 17/30017* (2013.01); *G06F 17/30861* (2013.01);
(Continued)

(58) Field of Classification Search
CPC ....................................................... G06F 21/10
USPC ............................................................ 726/7
See application file for complete search history.

(56) References Cited

U.S. PATENT DOCUMENTS

| 2007/0088406 A1 | 4/2007 | Bennett et al. ................. 607/60 |
| 2008/0010286 A1 | 1/2008 | Zhang |
| 2008/0168073 A1 | 7/2008 | Siegel et al. |

FOREIGN PATENT DOCUMENTS

| EP | 1 808 771 A1 | 7/2007 |
| JP | 2000-20434 A | 1/2000 |

(Continued)

OTHER PUBLICATIONS

Japanese Office Action for JP Application No. 2013-070854 mailed on Dec. 10, 2013 with partial English Translation.
(Continued)

*Primary Examiner* — Jacob Lipman

(57) ABSTRACT

This system 1 accepts content marker information including content identifier information for identifying content, and executes a process of causing a storing device to store the accepted content marker information. The system 1 accepts sharing-user identifier information for identifying a user/users who shares/share the stored content marker information. The system 1: accepts a content marker output request that includes user identifier information for identifying a user and that is a request for an output of content marker information; based on the user identifier information included in the accepted content marker output request and the accepted sharing-user identifier information, extracts content marker information corresponding to the user identifier information from the stored content marker information; and outputs the extracted content marker information.

4 Claims, 19 Drawing Sheets

(51) Int. Cl.
*H04N 21/254* (2011.01)
*H04N 21/4788* (2011.01)
*H04N 21/84* (2011.01)
*G06F 17/30* (2006.01)

(52) U.S. Cl.
CPC ............ *G06F21/10* (2013.01); *H04N 21/2541* (2013.01); *H04N 21/4788* (2013.01); *H04N 21/84* (2013.01)

(56) References Cited

FOREIGN PATENT DOCUMENTS

| | | |
|---|---|---|
| JP | 2004173102 A | 6/2004 |
| JP | 2006260009 A | 9/2006 |
| JP | 2007058595 A | 3/2007 |
| JP | 2007102780 A | 4/2007 |
| JP | 2008065659 A | 3/2008 |
| JP | 2008112355 A | 5/2008 |
| JP | 2004229035 A | 7/2008 |
| JP | 2008158663 A | 7/2008 |
| WO | 2007075201 A | 7/2007 |

OTHER PUBLICATIONS

"IP Multimedia Subsystem", [Internet] <http://en.wikipedia.org/w/index.php?title=IP_Multimedia_Subsystem&oldid=234548968>, Aug. 27, 2008, pp. 1-12. Cited in EP Search Report.
The Extended European Search Report for EP Application No. 09812829.1 dated on Jun. 18, 2013.
Japanese Office Action for JP2010-528595 mailed on Jan. 29, 2013.
International Search Report for PCT/JP2009/003414 mailed Oct. 27, 2009.

CONTENT DELIVERY SYSTEM

CROSS-REFERENCE TO RELATED APPLICATIONS

The present application is a Continuation application of Ser. No. 13/062,253 filed on Mar. 4, 2011, which is a National Stage Entry of International Application PCT/JP2009/003414, filed on Jul. 22, 2009, which claims the benefit of priority from Japanese Patent Application 2008-231759 filed on Sep. 10, 2008, the disclosures of all of which are incorporated in their entirety by reference herein.

TECHNICAL FIELD

The present invention relates to a content delivery system that transmits content data representing content to user equipment.

BACKGROUND ART

A content delivery system that transmits content data representing content to user equipment is known. A system described in Patent Document 1 as one of such content delivery systems accepts content marker information transmitted by user equipment. Content marker information includes content identifier information for identifying content.

Then, the content delivery system stores the accepted content marker information. After that, in response to a content marker output request transmitted by the user equipment, the content delivery system transmits the stored content marker information to the user equipment.

On the other hand, upon reception of the content marker information, the user equipment prompts the user to select one of the received content marker information. Then, the user equipment transmits a content transmission request including the content marker information selected by the user to the content delivery system.

Upon reception of the content transmission request transmitted by the user equipment, the content delivery system transmits content data identified with the content transmission request to the user equipment. Consequently, without performing a cumbersome operation in order to specify content the user of the user equipment wants to view, the user can view the content.

[Patent Document 1] Japanese Unexamined Patent Application Publication No. JP-A 2004-173102

The content delivery system described above is configured to transmit the stored content marker information to user equipment in response to a request by any user. Therefore, the content delivery system has a problem that, even if one user wants only a specific user to see registered content marker information, a user other than the specific user may see the content marker information.

SUMMARY

Accordingly, an object of the present invention is to provide a content delivery system capable of solving the aforementioned problem, "content marker information registered by one user may be viewed by a user other than a specific user."

In order to achieve the object, a content delivery system of an exemplary embodiment of the present invention includes:

a content marker information accepting means configured to accept content marker information including content identifier information for identifying content;

a content marker information storing processing means configured to execute a process of causing a storing device to store the accepted content marker information;

a sharing-user identifier information accepting means configured to accept sharing-user identifier information for identifying a user/users who shares/share the stored content marker information;

a content marker output request accepting means configured to accept a content marker output request that includes user identifier information for identifying a user and that is a request for an output of content marker information; and a content marker outputting means configured to, based on the user identifier information included in the accepted content marker output request and the accepted sharing-user identifier information, extract content marker information corresponding to the user identifier information from the stored content marker information, and output the extracted content marker information.

Further, a content delivery system of another exemplary embodiment of the present invention includes an application server system and a connection control system.

Furthermore, the connection control system includes a Core IMS (Internet Protocol Multimedia Subsystem) part configured to receive equipment specification information transmitted by user equipment and establish a connection between the application server system and the user equipment based on the received equipment specification information.

In addition, the application server system includes:
a media functions part configured to transmit content data representing content to the user equipment with the connection established by the connection control system;
a service control functions part configured to control a service provided by the media functions part; and
a user profile server functions part configured to store profile information of a user of the user equipment.

Besides, the application server system includes:
a content marker information accepting means configured to accept content marker information, which is information transmitted by the user equipment and information including content identifier information for identifying content, by receiving the content marker information via the Core IMS part;
a content marker information storing processing means configured to execute a process of causing the user profile server functions part or the service control functions part to store the accepted content marker information;
a sharing-user identifier information accepting means configured to accept sharing-user identifier information, which is information transmitted by the user equipment and information for identifying a user/users who shares/share the stored content marker information, by receiving the sharing-user identifier information via the Core IMS part;
a content marker output request accepting means configured to accept a content marker output request, which is information transmitted by the user equipment and information including user identifier information for identifying a user and requesting for an output of content marker information, by receiving the content marker output request via the Core IMS part;
a content marker outputting means configured to, based on the user identifier information included in the accepted content marker output request and the accepted sharing-user identifier information, extract content marker information corresponding to the user identifier information from the stored content marker information, and output the extracted content marker information; and a content marker transmitting means configured to transmit the outputted content marker information to the user equipment having transmitted the content marker output request via the Core IMS part.

Further, a content delivery method of another exemplary embodiment of the present invention is a method including:

accepting content marker information including content identifier information for identifying content;

executing a process of causing a storing device to store the accepted content marker information;

accepting sharing-user identifier information for identifying a user/users who shares/share the stored content marker information;

accepting a content marker output request including user identifier information for identifying a user and requesting for an output of content marker information; and based on the user identifier information included in the accepted content marker output request and the accepted sharing-user identifier information, extracting content marker information corresponding to the user identifier information from the stored content marker information, and outputting the extracted content marker information.

Further, an application server system of another exemplary embodiment of the present invention includes:

a content marker information accepting means configured to accept content marker information including content identifier information for identifying content;

a content marker information storing processing means configured to execute a process of causing a storing device to store the accepted content marker information;

a sharing-user identifier information accepting means configured to accept sharing-user identifier information for identifying a user/users who shares/share the stored content marker information;

a content marker output request accepting means configured to accept a content marker output request including user identifier information for identifying a user and requesting for an output of content marker information; and a content marker outputting means configured to, based on the user identifier information included in the accepted content marker output request and the accepted sharing-user identifier information, extract content marker information corresponding to the user identifier information from the stored content marker information, and output the extracted content marker information.

Further, a computer program of another exemplary embodiment of the present invention is a computer program including instructions for causing an application server system to realize:

a content marker information accepting means configured to accept content marker information including content identifier information for identifying content;

a content marker information storing processing means configured to execute a process of causing a storing device to store the accepted content marker information;

a sharing-user identifier information accepting means configured to accept sharing-user identifier information for identifying a user/users who shares/share the stored content marker information;

a content marker output request accepting means configured to accept a content marker output request including user identifier information for identifying a user and requesting for an output of content marker information; and a content marker outputting means configured to, based on the user identifier information included in the accepted content marker output request and the accepted sharing-user identifier information, extract content marker information corresponding to the user identifier information from the stored content marker information, and output the extracted content marker information.

With the configurations of the present invention as described above, it is possible to allow only a specific user to view content marker information registered by one user.

Figure 17:
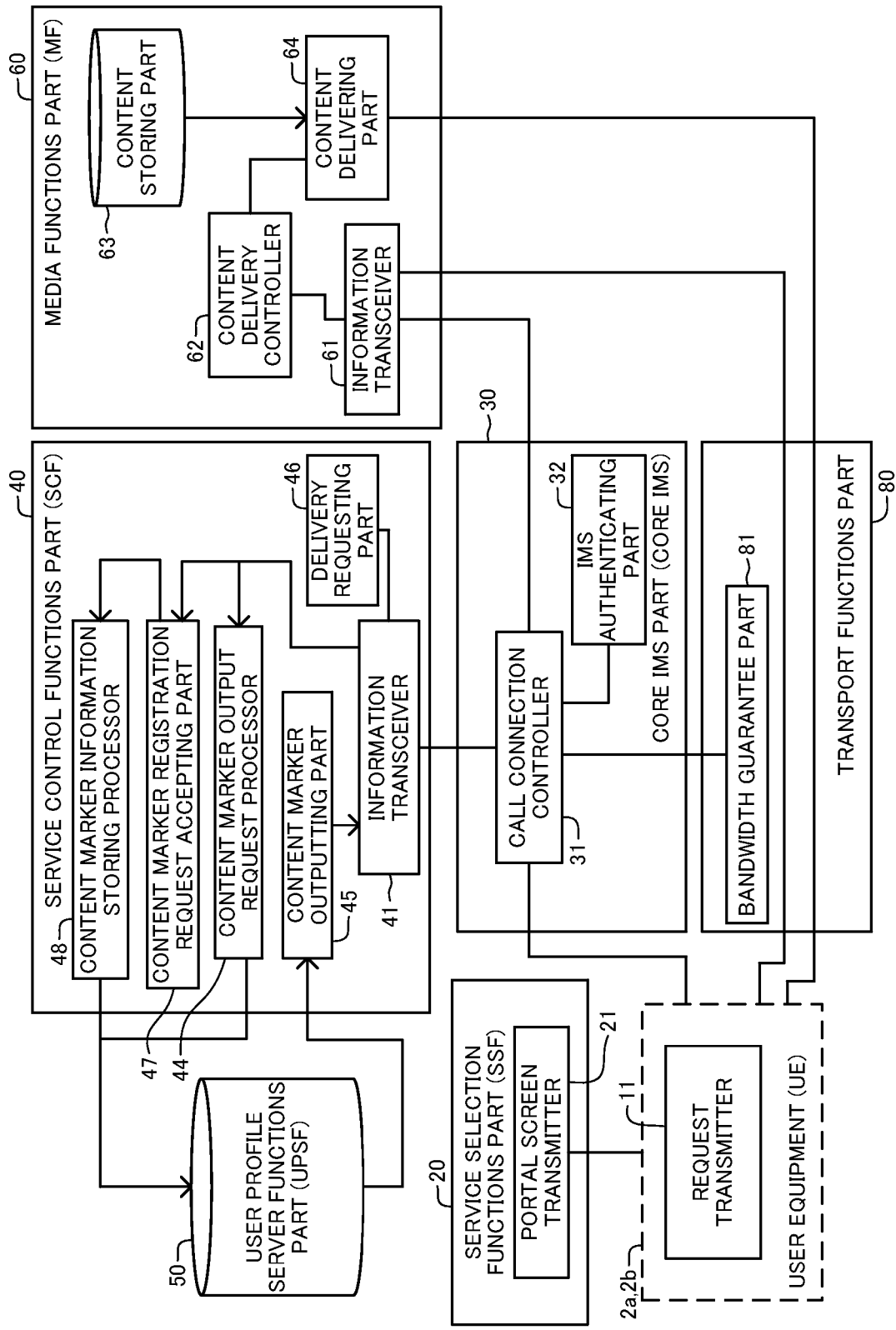
Figure 18:
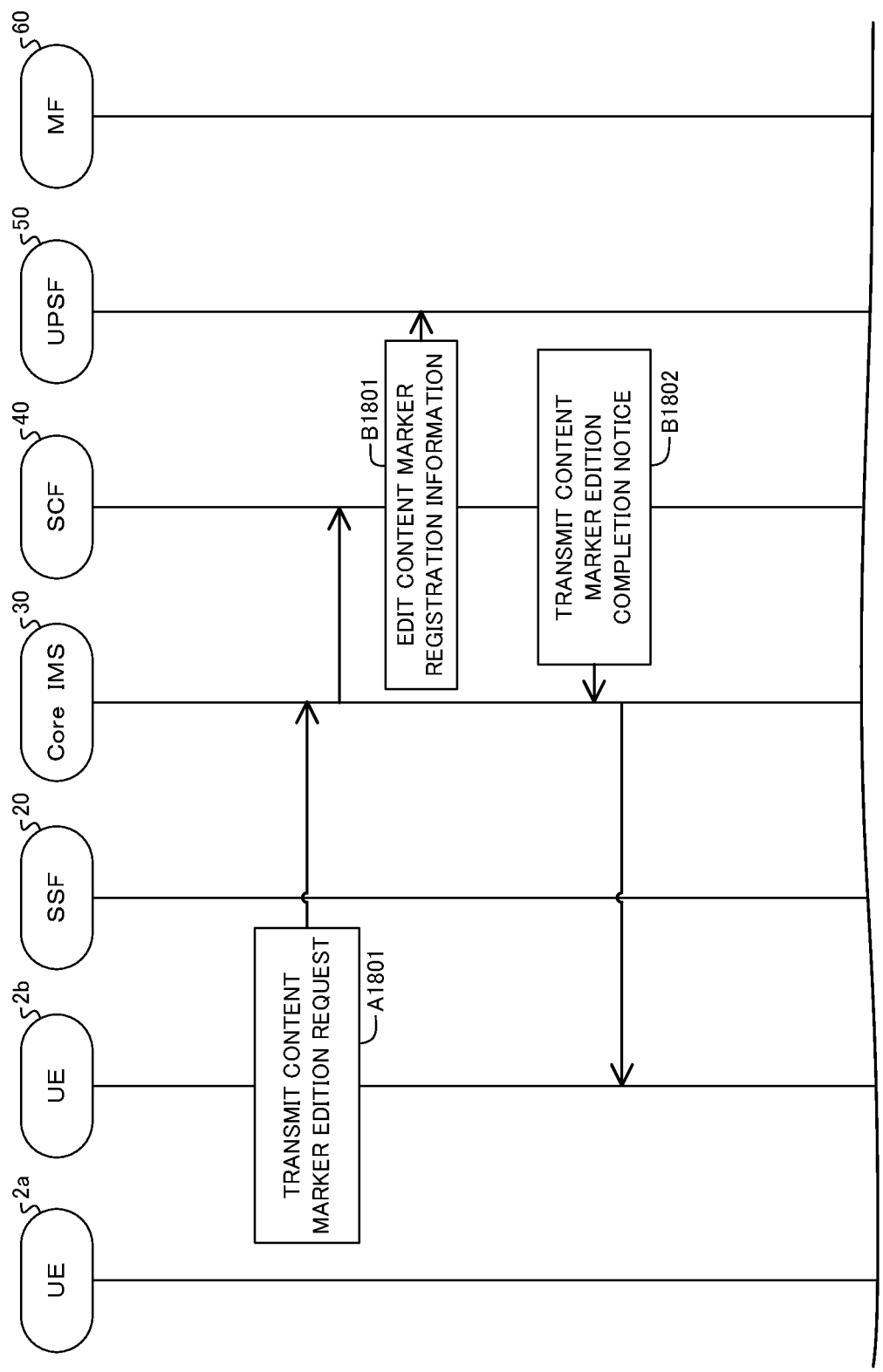
Figure 19:
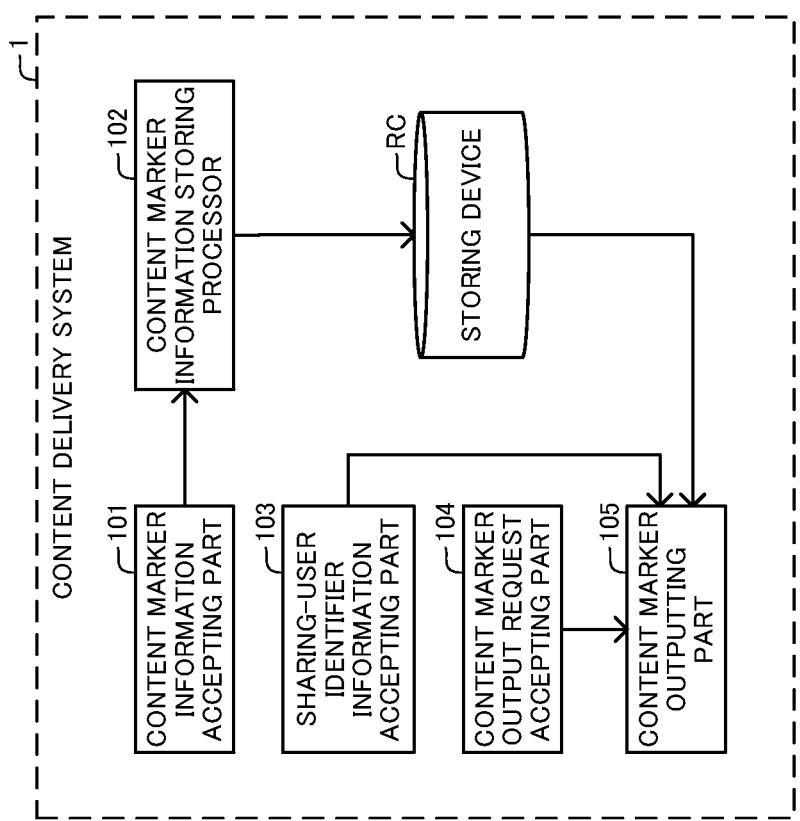

FIG. 17 is a block diagram schematically showing a function of a content delivery system according to a second exemplary embodiment;

FIG. 18 is a sequence diagram showing an operation of the content delivery system according to the second exemplary embodiment when changing a user/users who shares/share content marker information in response to an input by the user of the user equipment; and FIG. 19 is a block diagram schematically showing a function of a content delivery system according to a fourth exemplary embodiment.

EXEMPLARY EMBODIMENT

Below, exemplary embodiments of a content delivery system, a content delivery method, an application server system and a computer program according to the present invention will be described with reference to FIGS. 1 to 19.

First Exemplary Embodiment (Configuration)

Figure 1:
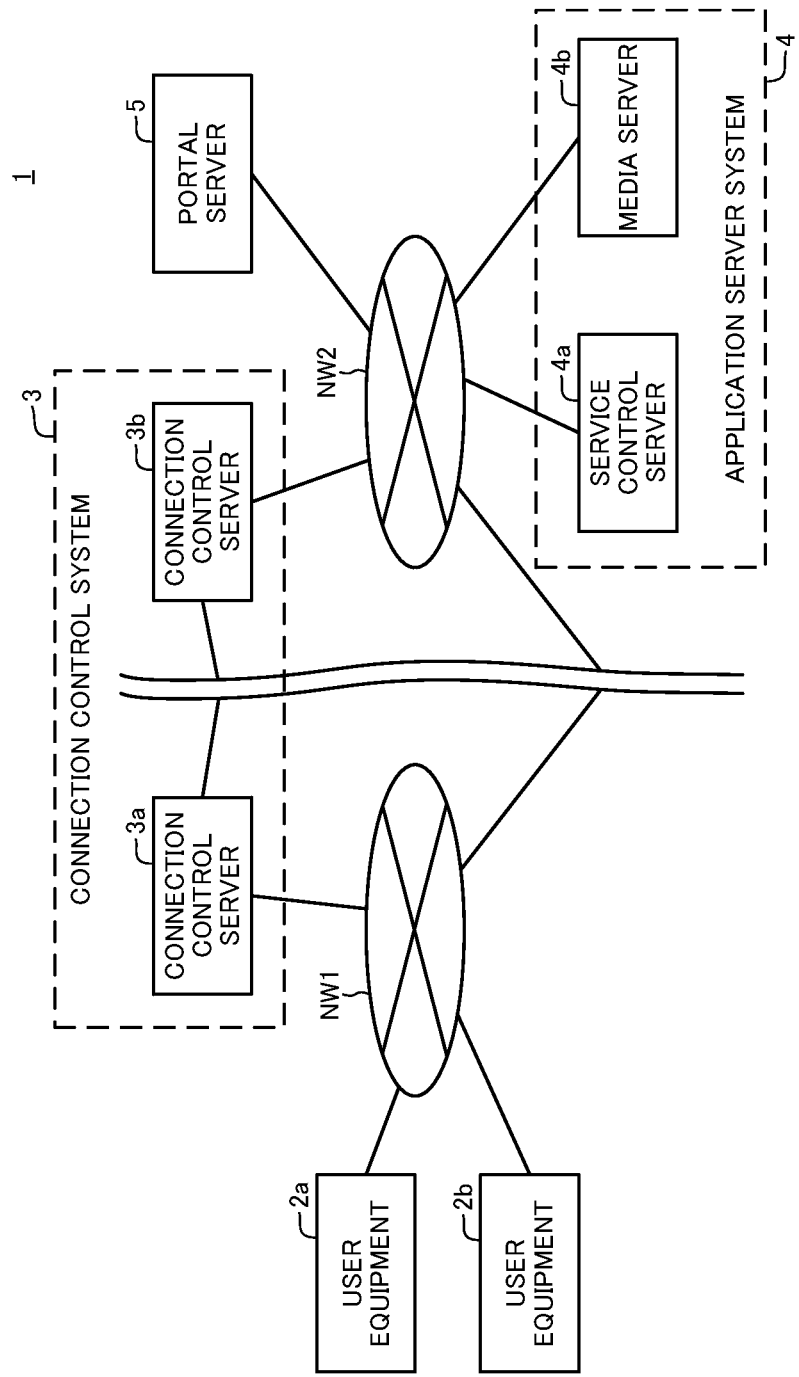
FIG. 1 is a diagram showing a schematic configuration of a content delivery system according to a first exemplary embodiment of the present invention.

As shown in FIG. 1, a content delivery system 1 according to a first exemplary embodiment is a VoD (Video-on-Demand) system. The content delivery system 1 may be an IPTV (Internet Protocol Television) system other than the VoD system, such as a BC (BroadCast) system that broadcasts content or an nPVR (network Personal Video Recorder) system that performs unicast delivery of previously recorded broadcast content.

The content delivery system 1 includes a connection control system 3, an application server system 4, and a portal server 5. The connection control system 3 includes a plurality of servers including a connection control server 3a and a connection control server 3b. The application server system 4 includes a plurality of servers including a service control server 4a and a media server 4b.

The connection control server 3a is connected with user equipment (UE) 2a and 2b so as to be capable of communicating via a user-side communication line NW1 configuring an IP (Internet Protocol) network. The connection control server 3b, the application server system 4 and the portal server 5 are connected so as to be capable of communicating with one another via a service-provider-side communication line NW2 configuring the abovementioned IP network.

The user equipment 2a is provided with a set top box and a remote controller, which are not shown in the drawings. The set top box is connected to a television, which is not shown in the drawings. The set top box receives content data representing content (a moving image composed of sounds and images in this exemplary embodiment) transmitted by the media server 4b, and converts the received content data to cause the television to output the content.

The remote controller is provided with a plurality of buttons (button-type switches). When the buttons are pressed by a user, the remote controller transmits infrared signals corresponding to the buttons to the set top box. The set top box receives the infrared signals from the remote controller to accept information inputted by the user.

Further, in the user equipment 2a, equipment specification information as information for specifying the equipment (the equipment itself) is stored in a memory serving as a storing device.

The user equipment 2b has the same configuration and function as the user equipment 2a.

The connection control server 3a, the connection control server 3b, the service control server 4a, the media server 4b and the portal server 5 (i.e., the servers 3a to 5) are each provided with a central processing unit (CPU) and a storing device (a memory and a hard disk drive (HDD)) that are not shown in the drawings. Each of the servers 3a to 5 is configured to realize a function described later by execution of a program stored in the storing device by the CPU.

The connection control server 3a and the connection control server 3b are each configured to transmit and receive SIP messages (messages according to SIP (Session Initiation Protocol)) to control a connection among a plurality of devices. That is to say, the connection control server 3a and the connection control server 3b are SIP servers.

The connection control system 3 is configured to, when receiving an SIP message including equipment specification information transmitted by the user equipment 2a (or the user equipment 2b), establish a connection (a session) between the application server system 4 and the user equipment 2a (or the user equipment 2b) based on the equipment specification information included in the received SIP message.

The service control server 4a controls a service (a service of transmitting content data) provided by the media server 4b. The media server 4b transmits content data representing content to the user equipment 2a (or the user equipment 2b) connected by the connection control system 3.

The portal server 5 is configured to transmit and receive messages according to HTTP (Hypertext Transfer Protocol) (HTTP message) to transmit and receive data to and from the user equipment 2a (or the user equipment 2b). That is to say, the portal server 5 is a web server.

(Function)

Figure 2:
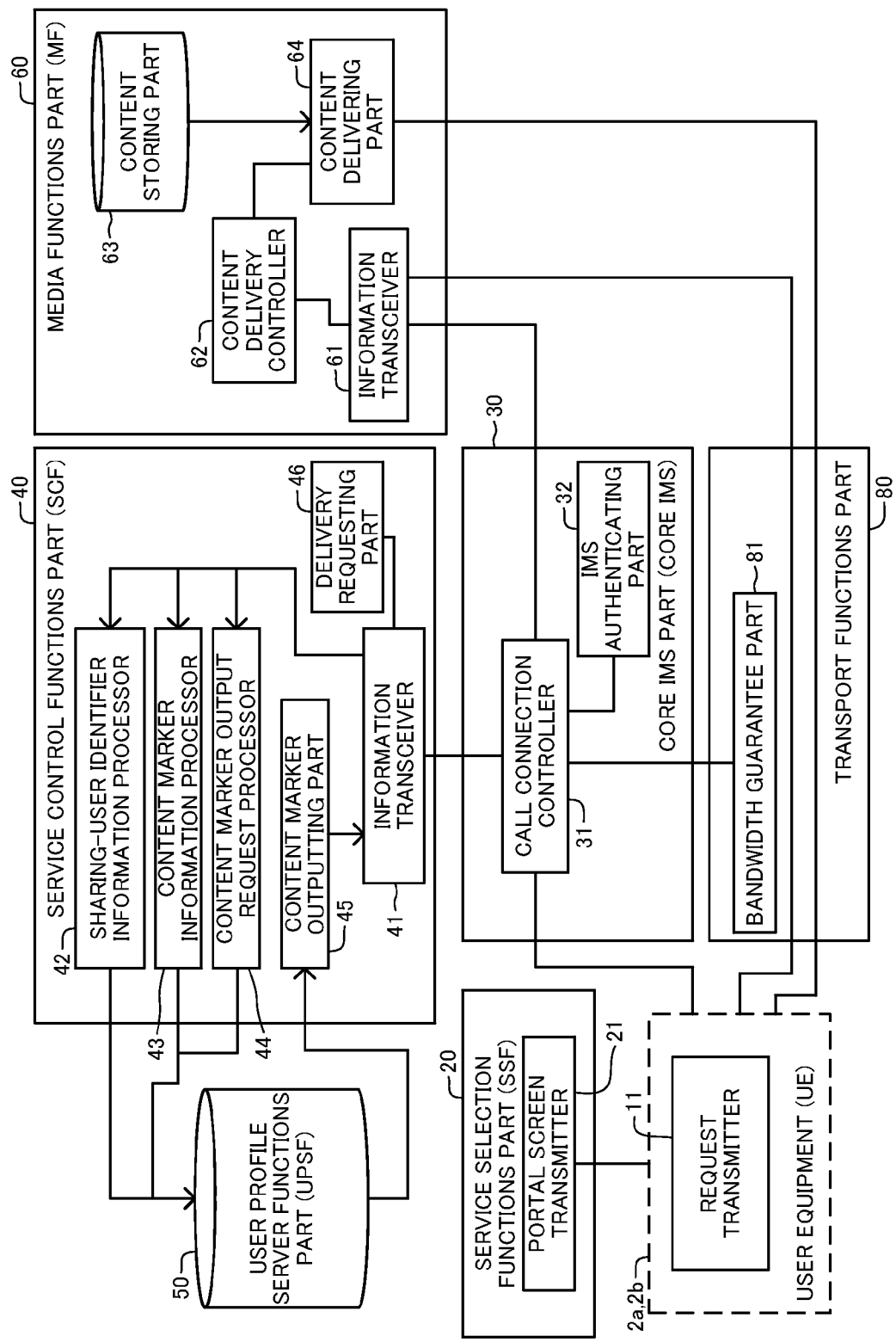
FIG. 2 is a block diagram schematically showing a function of the content delivery system shown in FIG. 1.

FIG. 2 is a block diagram showing a function of the content delivery system 1 configured as described above.

(Function: User Equipment)

The function of the user equipment 2a includes a request transmitter 11. When a power switch of the user equipment 2a is turned on (electric power is supplied), the request transmitter 11 transmits an SIP message as an equipment authenticating process request including stored equipment specification information, to the connection control server 3a.

Further, the request transmitter 11 receives an SIP message including equipment authentication success information from the connection control system 3. Equipment authentication success information is information that includes equipment address information representing a position on the IP network and represents the user equipment 2a in the position represented by the equipment address information is authenticated as valid equipment.

Furthermore, the request transmitter 11 transmits an SIP message including user authenticating information inputted by the user of the user equipment 2 via the remote controller, as a user authenticating process request, to the connection control system 3. In this exemplary embodiment, user authenticating information is composed of user identifier information representing a text for identifying the user of the user equipment 2, and password information representing a text as a password.

Further, the request transmitter 11 receives an SIP message including user authentication success information from the connection control system 3. User authentication success information is information including user identifier information and representing that the user identified with the user identifier information (i.e., the user having inputted user authenticating information) is authenticated as a valid user.

In the case of receiving user authentication success information from the connection control system 3, the request transmitter 11 transmits an SIP message including a process request of requesting the application server system to execute the process, to the connection control system 3 in response to a request transmission instruction inputted by the user of the user equipment 2. The process request includes the user authentication success information (i.e., the user identifier information).

(Function: Connection Control System)

A function of the connection control system 3 includes a Core IMS (Internet Protocol Multimedia Subsystem) part 30 and a transport functions part 80.

The Core IMS part 30 includes a call connection controller 31 and an IMS authenticating part (a user authenticating unit) 32. The call connection controller 31 transmits and receives SIP messages to control a connection among a plurality of devices.

Further, when the connection control server 3a receives an equipment authenticating process request from the user equipment 2a, 2b, the IMS authenticating part 32 determines whether or not the equipment specification information included in the received equipment authenticating process request corresponds to (in this exemplary embodiment, coincides with) equipment authenticating criterion information, thereby determining whether the user equipment 2a, 2b is valid equipment or not (executing an equipment authenticating process). Here, equipment authenticating criterion information is information previously stored in a storing device (a user profile file server functions part 50 described later) of the service control server 4a. Equipment authenticating criterion information may be information previously stored in the storing device of the connection control system 3.

Then, in a case that the IMS authenticating part 32 authenticates the user equipment 2a, 2b as valid equipment, the call connection controller 31 thereafter executes a process (e.g., a process of transferring a message to the application server system 4) based on a message (a process request, etc.) transmitted by the user equipment 2a, 2b. In this case, the call connection controller 31 further transmits an SIP message including the equipment authentication success information to the user equipment 2a, 2b.

On the other hand, in a case that the IMS authenticating part 32 does not authenticate the user equipment 2a, 2b as valid equipment, the call connection controller 31 does not thereafter execute a process based on a message (a process request, etc.) transmitted by the user equipment 2a, 2b.

Furthermore, when the connection control server 3a receives a user authenticating process request from the user equipment 2a, 2b, the IMS authenticating part 32 determines whether or not user authenticating information included in the received user authenticating process request corresponds to the user authenticating criterion information, thereby determining whether or not a user having inputted the user authenticating information (a user identified with user identifier information included in the user authenticating information) is a valid user (whether or not a user identified with the user identifier information coincides with the user of the user equipment 2a, 2b) (executing a user authenticating process). Here, user authenticating criterion information is information previously stored in the storing device (the user profile server functions part 50 described later) of the service control server 4a. That is to say, the user profile server functions part 50 configures a user authenticating criterion information storing unit.

Then, in a case that the IMS authenticating part 32 authenticates the user having inputted the user authenticating information as a valid user, the call connection controller 31 transmits an SIP message including user authentication success information to the user equipment 2a, 2b. On the other hand, in a case that the IMS authenticating part 32 does not authenticate the user having inputted the user authenticating information as a valid user, the call connection controller 31 does not transmit an SIP message including user authentication success information to the user equipment 2a, 2b.

Furthermore, in the case of receiving a bandwidth guarantee instruction from the service control server 4a, the call connection controller 31 establishes a connection between the media server 4b and the user equipment 2a, 2b. A bandwidth guarantee instruction includes media delivery specification information for specifying the media server 4b, and communication bandwidth information representing a communication bandwidth. The call connection controller 31 transmits the received communication bandwidth information, and communication path specification information that specifies a communication path between the media server 4b specified by the received media delivery specification information and the user equipment 2a, 2b, to the transport functions part 80.

The transport functions part 80 includes a bandwidth guarantee part 81. The bandwidth guarantee part 81 receives the communication bandwidth information and the communication path specification information from the call connection controller 31, and executes a process (a bandwidth guaranteeing process) for guaranteeing a communication bandwidth represented by the received communication bandwidth information, in the communication path specified with the received communication path specification information.

(Function: Service Control Server)

On the other hand, the function of the service control server 4a includes a service control functions part (SCF) 40 and a user profile server functions part (UPSF) 50.

The user profile server functions part 50 stores profile information of the users of the user equipment 2a and 2b. To be specific, the user profile server functions part 50 stores a content marker table and a sharing-user table in association with user identifier information. The content marker table and/or the sharing-user table may be stored in the service control functions part 40.

The content marker table is a table including a plurality of content marker registration information. Content marker registration information is composed of content marker information and content marker identifier information for identifying the content marker information in pairs. Content marker information includes content identifier information for identifying content, a playing start position representing a position to start playing the content, and a playing finish position representing a position to finish playing the content.

Further, the sharing-user table is a table including sharing-user (authorized-user, or authorized-view-user) identifier information for identifying a user/users who shares/share the content marker information stored in the user profile server functions part 50. The sharing-user table may include one piece of sharing-user identifier information, or may include a plurality of sharing-user identifier information. In a case that the sharing-user table does not include sharing-user identifier information (includes only empty information), it is represented that there is no user that shares the content marker information.

Further, the service control functions part 40 includes an information transceiver (a content marker transmitting unit) 41, a sharing-user identifier information processor (a sharing-user identifier information accepting unit and a sharing-user identifier information storing processing unit) 42, a content marker information processor (a content marker information accepting unit and a content marker information storing processing unit) 43, a content marker output request processor (a content marker output request accepting unit) 44, a content marker outputting part (a content marker outputting unit) 45, and a delivery requesting part 46.

The information transceiver 41 receives a variety of information (requests, instructions, notices, etc.) transmitted by the user equipment 2a, 2b or the media server 4b via the Core IMS part 30 (through the Core IMS part 30). Moreover, the information transceiver 41 transmits a variety of information to the user equipment 2a, 2b or the media server 4b via the Core IMS part 30. In this exemplary embodiment, a variety of information is included in an SIP message.

Only when receiving a process request including user authentication success information from the user equipment 2a, 2b, the service control server 4a executes a process based on the process request. That is to say, in a case that the IMS authenticating part 32 authenticates a user having inputted user authenticating information as a valid user, the application server system 4 executes the process based on the process request.

The sharing-user identifier information processor 42 accepts a sharing-user identifier information registration request as a process request received by the information transceiver 41. A sharing-user identifier information registration request includes sharing-user identifier information, and user identifier information for identifying the user of the user equipment 2a, 2b. Then, the sharing-user identifier information processor 42 updates the sharing-user table stored by the user profile server functions part 50, based on the accepted sharing-user identifier information registration request.

To be specific, the sharing-user identifier information processor 42 adds sharing-user identifier information included in the received sharing-user identifier information registration request, to the sharing-user table stored in association with user identifier information included in the received sharing-user identifier information registration request. That is to say, the sharing-user identifier information processor 42 executes a process of causing the user profile server functions part 50 to store sharing-user identifier information and user identifier information for identifying the user of the user equipment 2a, 2b having transmitted the sharing-user identifier information in association with each other.

The content marker information processor 43 accepts a content marker registration request as a process request received by the information transceiver 41. A content marker registration request includes sharing permission information, content marker information, and user identifier information for identifying the user of the user equipment 2a, 2b. Sharing permission information is information representing whether to permit sharing of content marker information with another user. Then, the content marker information processor 43 updates the content marker table stored in the user profile server functions part 50, based on the accepted content marker registration request.

To be specific, when the information transceiver 41 receives a content marker registration request, the content marker information processor 43 generates content marker identifier information. Then, the content marker information processor 43 adds content marker registration information composed of content marker information included in the content marker registration request and the generated content marker identifier information to a content marker table stored in association with user identifier information included in the received content marker registration request.

That is to say, the content marker information processor 43 executes a process of causing the user profile server functions part 50 to store the content marker information and the user identifier information included in the content marker registration request in association with each other.

Furthermore, in a case that the sharing permission information included in the content marker registration request represents that sharing of the content marker information with another user is permitted, the content marker information processor 43 specifies a sharing-user table stored in association with the user identifier information included in the content marker registration request among the sharing-user tables stored by the user profile server functions part 50.

Besides, the content marker information processor 43 acquires sharing-user identifier information included in the specified sharing-user table. Then, the content marker information processor 43 generates content marker identifier information with respect to each of the acquired sharing-user identifier information, and also adds content marker registration information composed of the content marker information included in the content marker registration request and the generated content marker identifier information, to a content marker table stored in association with the sharing-user identifier information as user identifier information.

That is to say, in a case that the sharing permission information included in the content marker registration request represents that sharing of content marker information with another user is permitted, the content marker information processor 43 executes a process of causing the user profile server functions part 50 to store user identifier information identical to the sharing-user identifier information stored in association with the abovementioned user identifier information and the content marker information, in association with each other.

Further, the content marker output request processor 44 accepts a content marker output request as a process request received by the information transceiver 41. A content marker output request is information including user identifier information and requesting for an output of content marker information.

The content marker outputting part 45 specifies a content marker table stored in association with user identifier information identical to the user identifier information included in the content marker output request accepted by the content marker output request processor 44. The content marker outputting part 45 outputs content marker information included in the specified content marker table. That is to say, the content marker outputting part 45 extracts content marker information stored in association with user identifier information identical to the user identifier information included in the accepted content marker output request, and outputs the extracted content marker information.

Then, the information transceiver 41 transmits the content marker information outputted by the content marker outputting part 45 to the user equipment 2a, 2b having transmitted the content marker output request.

The delivery requesting part 46 accepts a content transmission request as a process request received by the information transceiver 41. A content transmission request is information that is transmitted by the user equipment 2a, 2b and that includes equipment address information and content marker information. The delivery requesting part 46 outputs a content transmission instruction including content identifier information and equipment address information included in the content transmission request. The information transceiver 41 transmits the content transmission instruction outputted by the delivery requesting part 46 to the media server 4b via the Core IMS part 30.

(Function: Media Server)

The function of the media server 4b includes a media functions part (MF) 60. The media functions part 60 includes a media control functions part (MCF) and a media delivery functions part (MDF).

The media functions part 60 includes an information transceiver 61, a content delivery controller 62, a content storing part 63, and a content delivering part 64.

The information transceiver 61 receives a variety of information transmitted by the service control server 4a via the Core IMS part 30. Moreover, the information transceiver 61 transmits a variety of information to the service control server 4a via the Core IMS part 30.

Furthermore, the information transceiver 61 receives a content viewing request from the user equipment 2a, 2b. A content viewing request includes content identifier information, a playing start position, and a playing finish position. Besides, the information transceiver 61 receives a playing start request in accordance with a predetermined communication protocol (RTSP (Real Time Streaming Protocol) in this exemplary embodiment) from the user equipment 2a, 2b. A playing start request is information representing a request for start of transmission of content data.

In a case that the information transceiver 61 receives a content transmission instruction, the content delivery controller 62 determines a media server to transmit content data, based on content identifier information and equipment address information included in the content transmission instruction. The content delivery controller 62 transmits media delivery specification information for specifying the determined media server and the content identifier information to the service control server 4a via the Core IMS part 30.

The service control server 4a determines a communication bandwidth necessary for transmitting content data identified with the content identifier information, based on the media delivery specification information and the content identifier information having been received. The service control server 4a transmits a bandwidth guarantee instruction including communication bandwidth information representing the determined communication bandwidth and the received media delivery specification information, to the Core IMS part 30. Furthermore, the service control server 4a transmits the media delivery specification information and the content identifier information having been received, to the user equipment 2 via the Core IMS part 30.

The content storing part 63 previously stores content data representing content in association with content identifier information.

When the information transceiver 61 receives a playing start request, the content delivering part 64 specifies content data identified with content identifier information included in a content viewing request received by the information transceiver 61 among the content data stored in the content storing part 63.

Then, the content delivering part 64 transmits a portion of the specified content data between the playing start position and the playing finish position included in the content viewing request. At this moment, the content delivering part 64 uses the session established by the Core IMS part 30 to transmit the data in accordance with a predetermined communication protocol (in this exemplary embodiment, RTP (Real-time Transport Protocol).

(Function: Portal Server)

The function of the portal server 5 includes a service selection functions part 20. The service selection functions part 20 includes a portal screen transmitter 21.

The portal screen transmitter 21 receives a portal screen request transmitted by the user equipment 2a, 2b. The portal screen transmitter 21 transmits portal screen information to the user equipment 2a, 2b in accordance with the received portal screen request.

(Operation)

Next, an operation of the content delivery system 1 will be specifically described.

(Operation: Authenticating Process)

Figure 3:
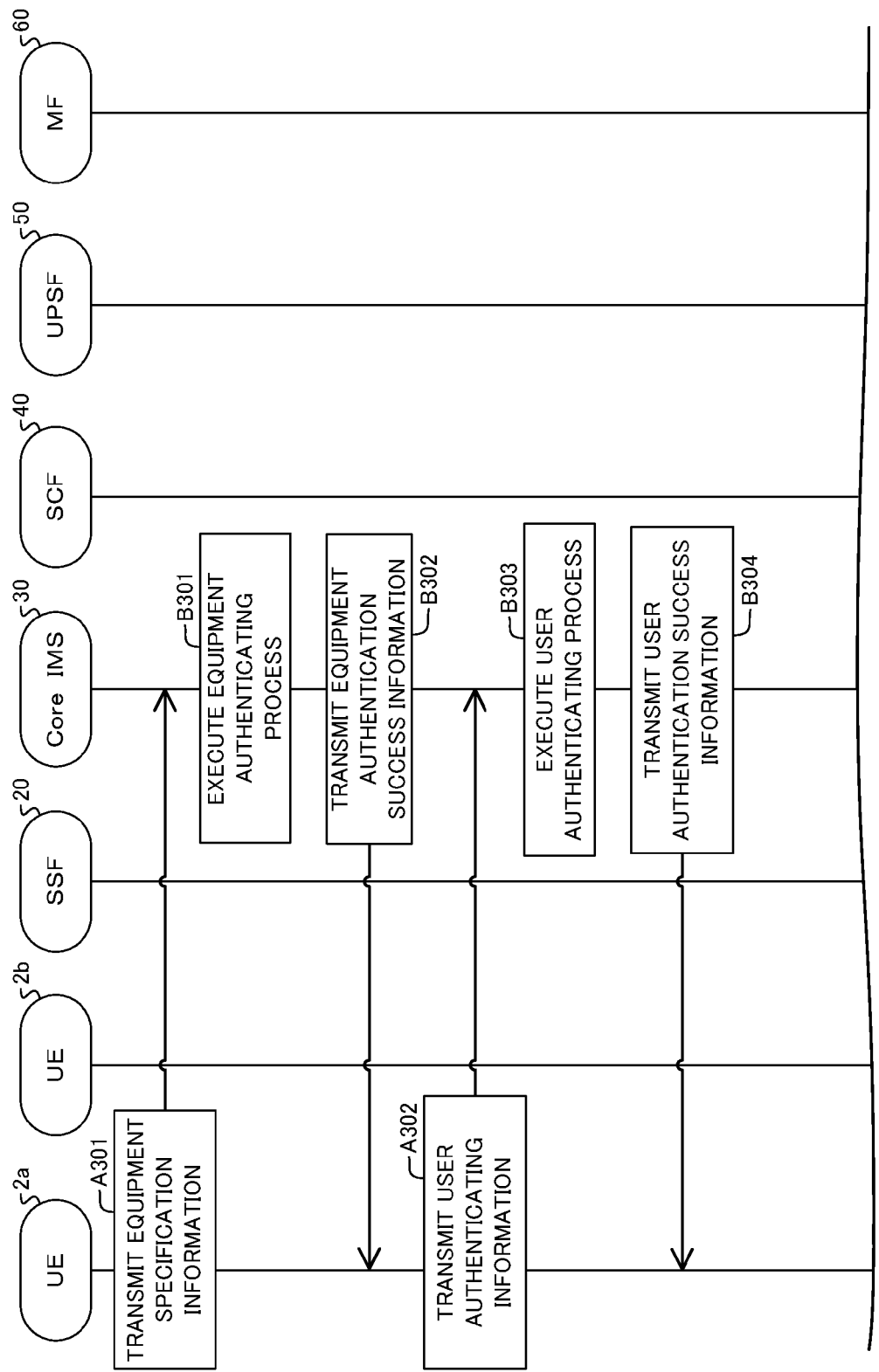
FIG. 3 is a sequence diagram showing an operation of the content delivery system shown in FIG. 1 when authenticating user equipment and a user of the user equipment.

An operation of the content delivery system 1 when the content delivery system 1 authenticates the user of equipment 2a and the user of the user equipment 2a will be described with reference to a sequence diagram of FIG. 3.

First, the user turns on the power switch of the user equipment 2a, whereby electric power is supplied to the user equipment 2a. Consequently, the user equipment 2a transmits an equipment authenticating process request including stored equipment specification information to the connection control server 3a (the Core IMS part 30) (step A301).

The Core IMS part 30 determines whether or not the equipment specification information included in the received equipment authenticating process request corresponds to (in this exemplary embodiment, coincides with) previously stored equipment authenticating criterion information, thereby determining whether the user equipment 2a is valid equipment or not (executing an equipment authenticating process) (step B301). Then, in a case that the user equipment 2a is authenticated as valid equipment, the Core IMS part 30 transmits equipment authentication success information to the user equipment 2a (step B302). Equipment authentication success information is information including equipment address information and representing that the user equipment 2a is authenticated as valid equipment.

Upon reception of the equipment authentication success information, the user equipment 2a causes the not-shown television to display an image prompting a user UA to input user authenticating information. Consequently, the user UA manipulates the remote controller to input user authenticating information.

Then, upon reception of the input of the user authenticating information, the user equipment 2a transmits a user authenticating process request including the accepted user authenticating information to the Core IMS part 30 (step A302).

Consequently, the Core IMS part 30 receives the user authenticating process request. The Core IMS part 30 determines whether or not the user authenticating information included in the received user authenticating process request corresponds to (in this exemplary embodiment, coincides with) previously stored user authenticating criterion information, thereby determining whether the user identified with the user identifier information included in the user authenticating criterion information (the user having inputted the user authenticating information) is a valid user or not (executing a user authenticating process) (step B303, a user authenticating process). Then, in a case that the user having inputted the user authenticating information is authenticated as a valid user, the Core IMS part 30 transmits user authentication success information to the user equipment 2a (step B304).

Consequently, the user equipment 2a receives the user authentication success information. Then, the user equipment 2a thereafter transmits (an SIP message including) a process request including the user authentication success information to the Core IMS part 30.

(Operation: Sharing-User Registering Process)

Figure 4:
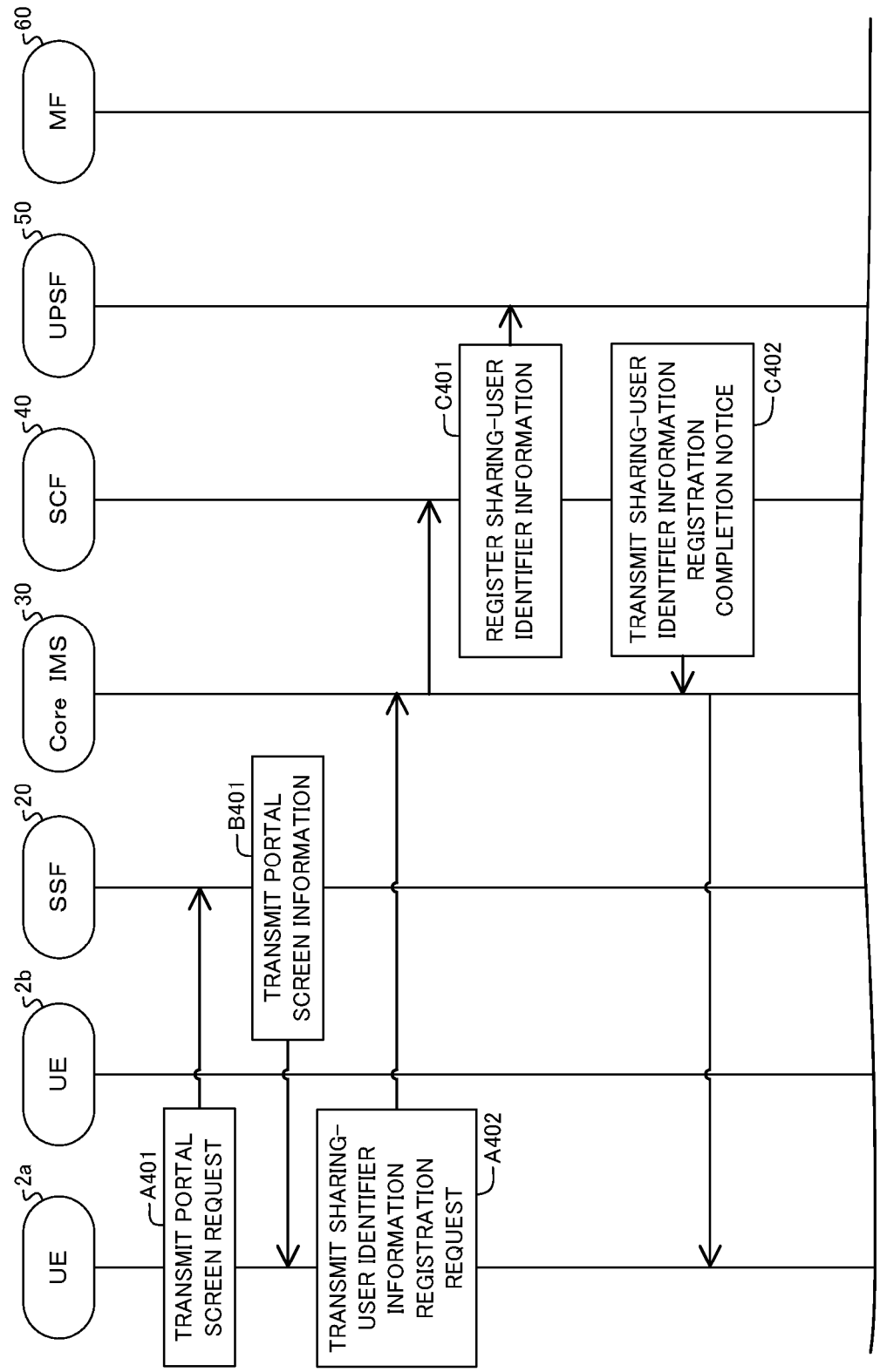
FIG. 4 is a sequence diagram showing an operation of the content delivery system shown in FIG. 1 when registering sharing-user identifier information in response to an input by the user of the user equipment.

Next, an operation of the content delivery system 1 when the content delivery system 1 registers a user/users who shares/share content marker information, in response to an input by the user UA of the user equipment 2a will be described with reference to a sequence diagram of FIG. 4.

Firstly, the user equipment 2a transmits a portal screen request to the service selection functions part 20 (step A401). Consequently, in response to the received portal screen request, the service selection functions part 20 transmits portal screen information representing a portal screen to the user equipment 2a (step B401). Then, the user equipment 2a causes the not-shown television to display an image represented by the received portal screen information. This image includes an input field for inputting the sharing-user identifier information and a button for instructing to request for registration of the sharing-user identifier information.

The user UA of the user equipment 2a then inputs the sharing-user identifier information via the remote controller. Moreover, the user UA performs an operation of pressing own the button for instructing to request for registration of the sharing-user identifier information.

Consequently, the user equipment 2a transmits a sharing-user identifier information registration request that includes the user authentication success information as user identifier information for identifying the user UA and the inputted sharing-user identifier information, to the service control functions part 40 via the Core IMS part 30 (through the Core IMS part 30) (step A402).

Consequently, the service control functions part 40 receives the sharing-user identifier information registration request (a sharing-user identifier information accepting step). Next, the service control functions part 40 specifies a sharing-user table stored in association with the user identifier information included in the received sharing-user identifier information registration request among the sharing-user tables stored in the user profile server functions part 50.

Then, the service control functions part 40 adds (registers) the sharing-user identifier information included in the received sharing-user identifier information registration request to the specifies sharing-user table (step C401, a sharing-user identifier information storing process step).

Then, the service control functions part 40 transmits a sharing-user identifier information registration completion notice to the user equipment 2a via the Core IMS part 30 (step C402). A sharing-user identifier information registration completion notice is a notice representing that registration of sharing-user identifier information has been completed. Then, upon reception of the sharing-user identifier information registration completion notice, the user equipment 2a causes the not-shown television to display an image representing that registration of the sharing-user identifier information has been completed.

(Operation: Content List Acquiring Process)

Figure 5:
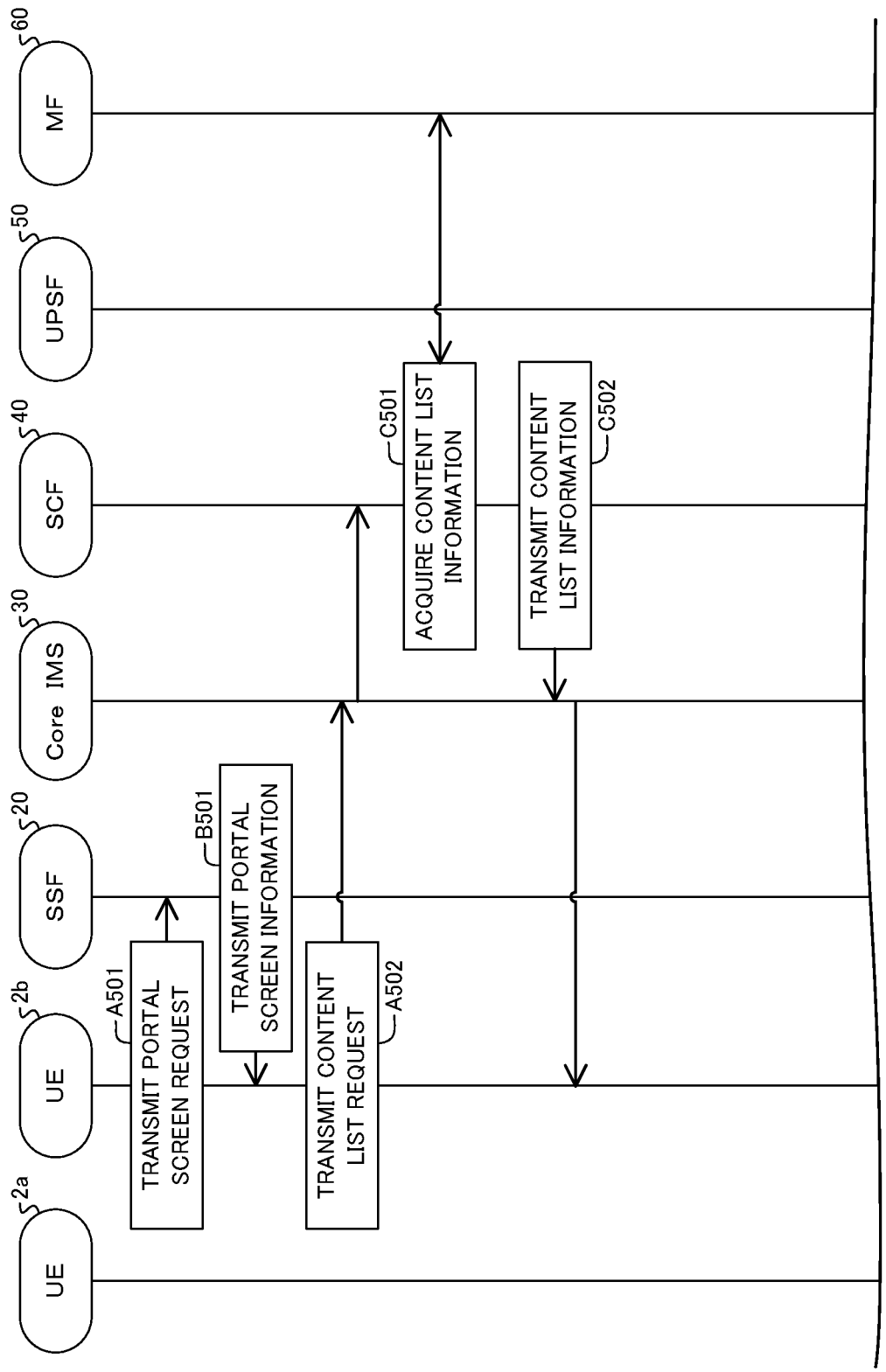
FIG. 5 is a sequence diagram showing an operation of the content delivery system shown in FIG. 1 when acquiring a list of content in response to an input by the user of the user equipment.

Next, an operation of the content delivery system 1 when the content delivery system 1 acquires a list of content in response to an input by a user UB of the user equipment 2b will be described with reference to a sequence diagram of FIG. 5.

Firstly, in a like manner as the user equipment 2a (refer to FIG. 3), the user equipment 2b transmits an equipment authenticating process request and a user authenticating process request to the Core IMS part 30, thereby receiving user authentication success information from the Core IMS part 30.

Then, the user equipment 2b transmits a portal screen request to the service selection functions part 20 (step A501). Consequently, in response to the received portal screen request, the service selection functions part 20 transmits portal screen information representing a portal screen to the user equipment 2b (step B501). Then, the user equipment 2b causes the not-shown television to display an image represented by the received portal screen information. This image includes a menu for instructing to request for a content list.

The user UB of the user equipment 2b then inputs information for selecting the menu for instructing to request for a content list. Consequently, the user equipment 2b transmits a content list request as a process request including the user authentication success information to the service control functions part 40 via the Core IMS part 30 (step A502).

Consequently, the service control functions part 40 receives the content list request. Next, the service control functions part 40 acquires content list information representing a list of content represented by content data stored in the media server 4b (the media functions part 60) (step C501).

Next, the service control functions part 40 transmits the acquired content list information to the user equipment 2b via the Core IMS part 30 (step C502). Then, upon reception of the content list information, the user equipment 2b causes the not-shown television to display the list of content represented by the content list information.

(Operation: Content Marker Registering Process)

Next, an operation of the content delivery system 1 when the content delivery system 1 registers content marker information in response to an input by the user UB of the user equipment 2b will be described with reference to a sequence diagram of FIG. 6.

In a state that a content list is displayed on the television, the user UB of the user equipment 2b selects content and inputs content specification information that specifies the selected content. Content specification information includes content identifier information. Moreover, the user UB inputs information representing a playing start position and a playing finish position of the selected content.

In addition, the user UB inputs sharing permission information that represents whether to permit sharing of content marker information with another user.

Consequently, the user equipment 2b transmits a content marker registration request that includes content marker information including the inputted sharing permission information, content identifier information, the playing start position and the playing finish position, and the user authentication success information as user identifier information for identifying the user UB, to the service control functions part 40 via the Core IMS part 30 (step A601).

Consequently, the service control functions part 40 receives the content marker registration request (a content marker information accepting step). Next, the service control functions part 40 generates content marker identifier information. Moreover, the service control functions part 40 specifies a content marker table stored in association with the user identifier information included in the received content marker registration request among the content marker tables stored in the user profile server functions part 50.

Then, the service control functions part 40 adds content marker registration information composed of the content marker information included in the received content marker registration request and the generated content marker identifier information, to the specified content marker table.

Furthermore, in a case that the sharing permission information included in the content marker registration request represents that sharing of the content marker information with another user is permitted, the service control functions part 40 adds the content marker information to a content marker table stored in association with a user/users who shares/share the content marker information.

Assuming the sharing permission information included in the content marker registration request represents that sharing of the content marker information with another user is permitted, the description will be continued. In this case, the service control functions part 40 specifies a sharing-user table stored in association with the user identifier information included in the content marker registration request among sharing-user tables stored in the user profile server functions part 50.

Furthermore, the service control functions part 40 acquires sharing-user identifier information included in the specified sharing-user table. Then, the service control functions part 40 generates content marker identifier information with respect to each of the acquired sharing-user identifier information, and also adds the content marker registration information composed of the content marker information included in the abovementioned content marker registration request and the generated content marker identifier information, to a content marker table stored in association with the sharing-user identifier information (step B601; a content marker information storing processing step).

In a case that the sharing permission information included in the content marker registration request represents that sharing of the content marker information with another user is not permitted, the service control functions part 40 does not register the content marker information to a content marker table other than the content marker table stored in association with the user identifier information included in the content marker registration request.

Then, the service control functions part 40 transmits a content marker information registration completion notice to the user equipment 2b via the Core IMS part 30 (step B602). A content marker information registration completion notice is a notice representing that registration of content marker information has been completed. Then, upon reception of the content marker information registration completion notice, the user equipment 2b causes the not-shown television to display an image representing that registration of the content marker information has been completed.

In the description of the operation of the content delivery system 1 hereinbefore, the user UA selects one piece of content from a content list, and thereby registers content marker information including content identifier information for identifying the selected content to the content delivery system 1.

The operation of the content delivery system 1 when the user UA selects one piece of content marker information from a content marker information list and thereby registers the selected content marker information to the content delivery system 1 can also be described in a like manner. Moreover, the operation of the content delivery system 1 when the user UA registers content marker information including content identifier information for identifying content the user is viewing to the content delivery system 1 can also be described in a like manner.

(Operation: Content Marker Information Acquiring Process)

Figure 7:
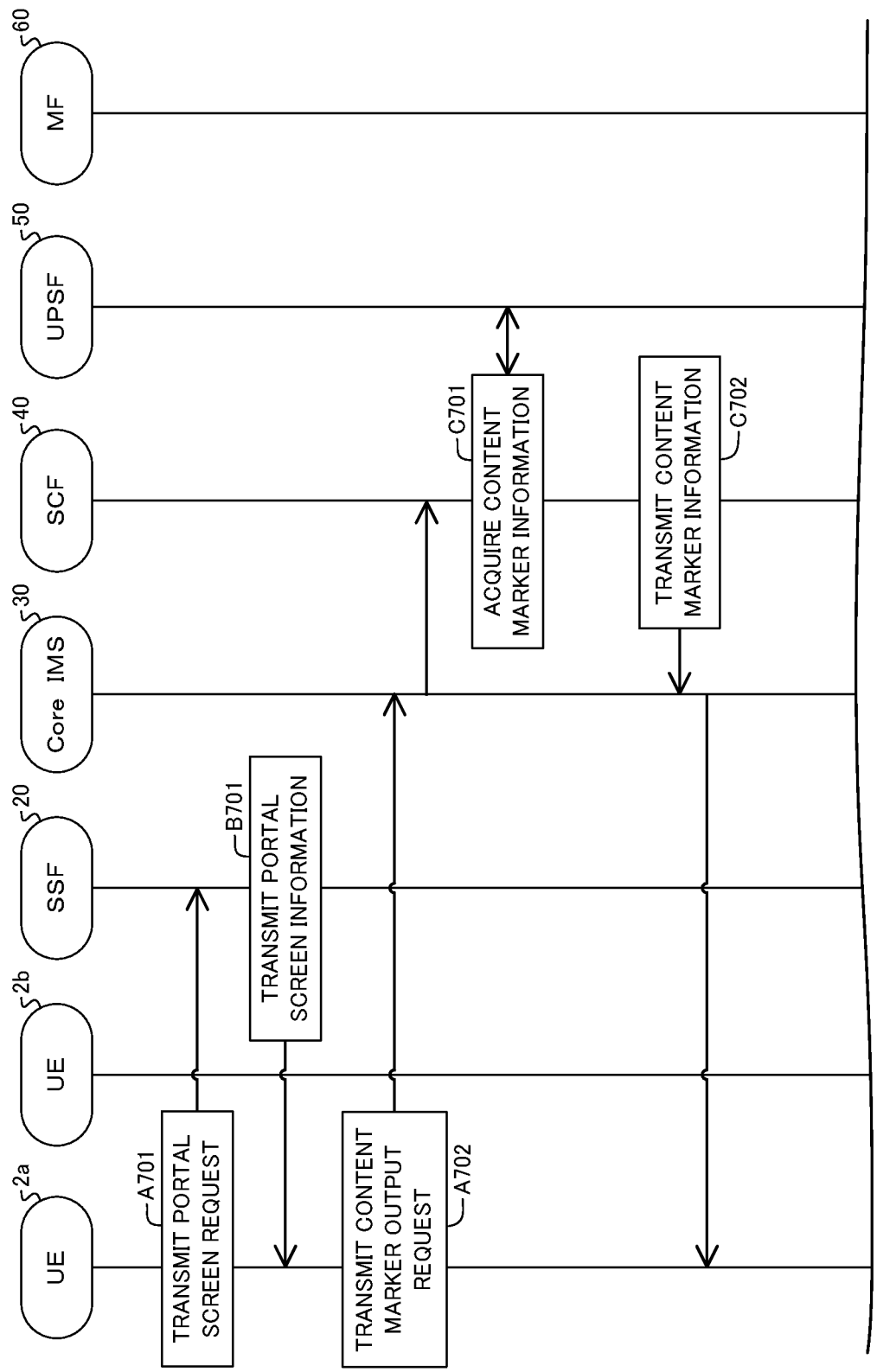
FIG. 7 is a sequence diagram showing an operation of the content delivery system shown in FIG. 1 when acquiring a list of content marker information in response to an input by the user of the user equipment.

Next, an operation of the content delivery system 1 when the content delivery system 1 acquires content marker information in response to an input by the user UA of the user equipment 2a will be described with reference to a sequence diagram of FIG. 7.

Firstly, the user equipment 2a transmits a portal screen request to the service selection functions part 20 (step A701). Consequently, in response to the received portal screen request, the service selection functions part 20 transmits portal screen information representing a portal screen to the user equipment 2a (step B701). Then, the user equipment 2a causes the not-shown television to display an image represented by the received portal screen information. This image includes a menu for instructing to request for an output of content marker information.

The user UA of the user equipment 2a then inputs information on selection of the menu for instructing to request for an output of content marker information. Consequently, the user equipment 2a transmits a content marker output request that includes user authentication success information as user identifier information for identifying the user UA and that requests for an output of content marker information, to the service control functions part 40 via the Core IMS part 30 (step A702).

Consequently, the service control functions part 40 receives the content marker output request (a content marker output request accepting step). Then, the service control functions part 40 specifies a content marker table stored in association with user identifier information identical to the user identifier information included in the received content marker output request, among the content marker tables stored in the user profile server functions part 50. Moreover, the service control functions part 40 acquires (outputs) content marker information included in the specified content marker table (step C701; a content marker outputting step).

Then, the service control functions part 40 transmits the acquired content marker information to the user equipment 2a (having transmitted the content marker output request) via the Core IMS part 30 (step C702). Then, upon reception of the content marker information, the user equipment 2a causes the not-shown television to display a list of the received content marker information.

(Operation: Content Viewing Process)

Figure 8:
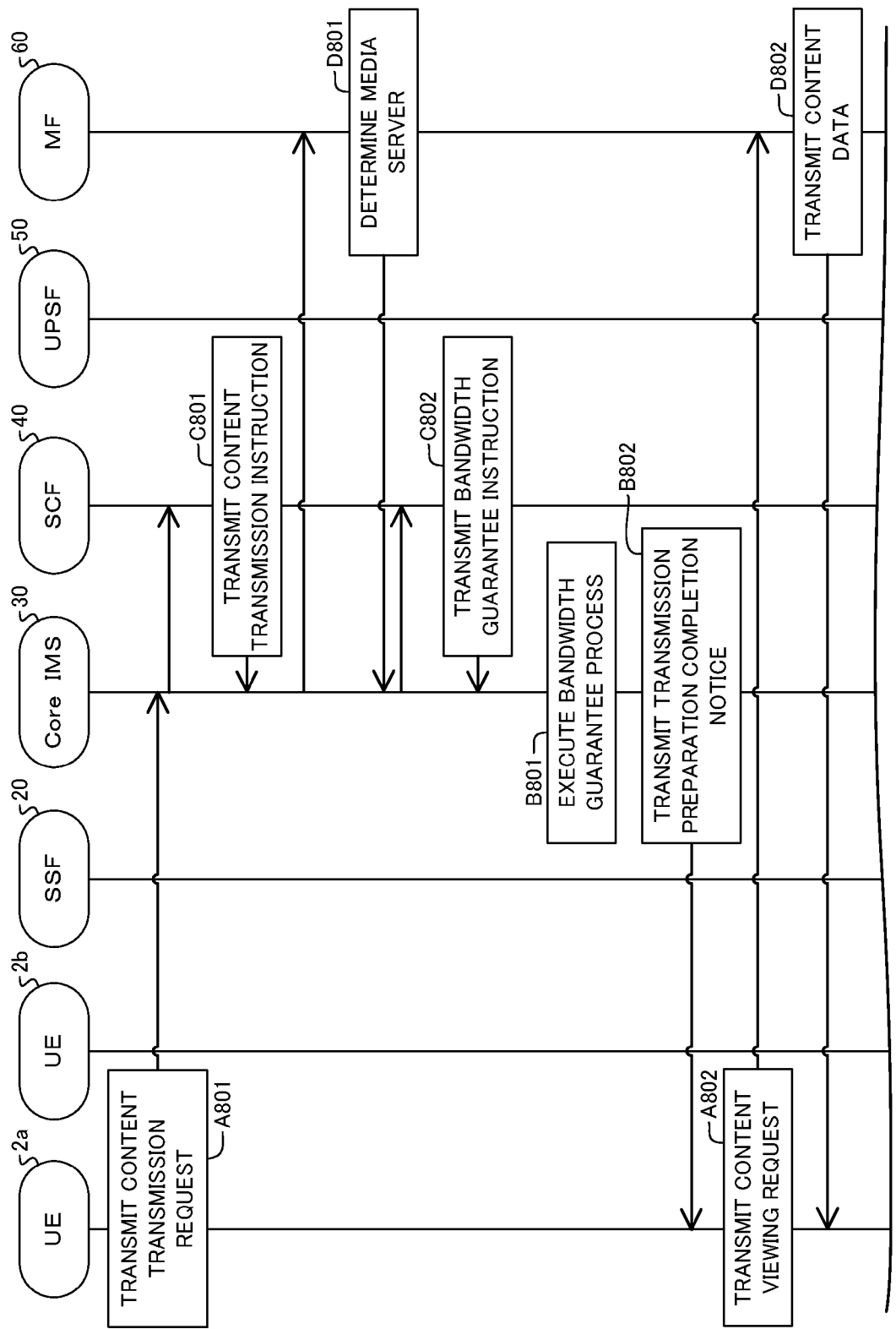
FIG. 8 is a sequence diagram showing an operation of the content delivery system shown in FIG. 1 when transmitting content data to the user equipment in response to an input by the user of the user equipment.

Next, an operation of the content delivery system 1 when the content delivery system 1 transmits content data to the user equipment 2a in response to an input by the user UA of the user equipment 2a will be described with reference to a sequence diagram of FIG. 8.

In a state that a list of content marker information is displayed on the television, the user UA of the user equipment 2a selects content marker information, and inputs content marker specification information for specifying the selected content marker information.

Consequently, the user equipment 2a transmits a content transmission request as a process request, which includes content identifier information included in the content marker information specified with the inputted content marker specification information, user authentication success information as user identifier information for identifying the user UA and equipment address information, to the service control functions part 40 via the Core IMS part 30 (step A801).

Then, upon reception of the content transmission request, the service control functions part 40 transmits a content transmission instruction to the media functions part 60 via the Core IMS part 30 (step C801). A content transmission instruction includes equipment address information, user identifier information, and content identifier information. Consequently, the media functions part 60 receives the content transmission instruction.

Then, the media functions part 60 determines a media server to transmit content data, based on the content identifier information and the equipment address information included in the content transmission instruction. Moreover, the media functions part 60 transmits media delivery specification information for specifying the determined media server (in this exemplary embodiment, the media server 4b) and the content identifier information to the service control functions part 40 via the Core IMS part 30 (step D801).

Consequently, the service control functions part 40 receives the media delivery specification information and the content identifier information. Then, based on the received media delivery specification information and content identifier information, the service control functions part 40 determines a communication bandwidth necessary for transmission of content data identified with the content identifier information.

Furthermore, the service control functions part 40 transmits a bandwidth guarantee instruction, which includes communication bandwidth information representing the determined communication bandwidth and the received media delivery specification information and content identifier information, to the Core IMS part 30 (step C802).

Upon reception of the bandwidth guarantee instruction, the Core IMS part 30 establishes a connection (a session) between the media server 4b and the user equipment 2a (a connection establishing step). Moreover, the Core IMS part 30 transmits the received communication bandwidth information, and communication path specification information that specifies a communication path between the media server 4b specified with the received media delivery specification information and the user equipment 2a, to the transport functions part 80. Consequently, the transport functions part 80 executes a process for guaranteeing the communication path represented by the received communication bandwidth information, in the communication path specified with the received communication path specification information (a bandwidth guaranteeing process) (step B801).

Then, when the bandwidth guaranteeing process is completed, the Core IMS part 30 transmits a transmission preparation completion notice to the user equipment 2a (step B802). A transmission preparation completion notice includes the received media delivery specification information and content identifier information.

Then, upon reception of the transmission preparation completion notice, the user equipment 2a transmits a content viewing request and a playing start request to the media server 4b (the media functions part 60) specified with the media delivery specification information included in the transmission preparation completion notice (step A802). A content viewing request includes the content identifier information included in the transmission preparation completion notice, and a playing start position and a playing finish position that are included in content marker information specified with the inputted content marker specification information described above.

Then, upon reception of the content viewing request and the playing start request, the media functions part 60 specifies content data identified with the content identifier information included in the received content viewing request, among content data stored in the content storing part 63.

Next, the media functions part 60 transmits, of the specified content data, a portion from the playing start position to the playing finish position included in the content viewing request to the user equipment 2a (step D802; a content transmitting step). At this moment, the media functions part 60 transmits the data by using the session established by the Core IMS part 30. Consequently, the user equipment 2a receives the content data, and causes the not-shown television to output content (in this exemplary embodiment, a moving image) represented by the received content data.

Hereinbefore, the operation of the content delivery system 1 when the user UA selects one piece of content marker information from a content marker information list and the content delivery system 1 thereby transmits content data corresponding to the selected content marker information to the user equipment 2a has been described. The operation of the content delivery system 1 when the user UA selects one piece of content from a content list and the content delivery system 1 transmits content data representing the selected content to the user equipment 2a can also be described in a like manner. Moreover, the operation of the content delivery system 1 when transmitting content data to the user equipment 2b can also be described in a like manner.

As described hereinbefore, according to the first exemplary embodiment of the content delivery system of the present invention, in the case of accepting a content marker output request from the user UA (a first user), the content delivery system 1 can transmit content marker information set to be shared with the user UA among content marker information registered by the user UB (another user), to the user equipment 2a used by the user UA. As a result, it is possible to permit only the user UA to view the content marker information registered by the user UB other than the user UA. That is to say, it is possible to increase the convenience of the users UA and UB.

Further, according to the first exemplary embodiment, the content delivery system 1 accepts a content marker output request including user identifier information for identifying a user who is authenticated as a valid user. Consequently, it is possible to prevent the content delivery system 1 from executing a process based on a content marker output request transmitted by a user who is not authenticated as a valid user. As a result, it is possible to prevent an invalid user from viewing content marker information.

Additionally, according to the first exemplary embodiment, the user UA of the user equipment 2a selects content marker information from a content marker information list, thereby being capable of viewing content corresponding to the content marker information. That is to say, the user UA, without performing a cumbersome operation in order to specify a content that the user wants to view, can view the content. As a result, it is possible to increase the convenience of the user UA.

Modified Example 1 of First Exemplary Embodiment

Next, a content delivery system according to a modified example 1 of the first exemplary embodiment of the present invention will be described. The content delivery system according to the modified example 1 is different from the content delivery system according to the first exemplary embodiment in that the service control server 4a (the service control functions part 40) executes a user authenticating process. Therefore, a description will be made below focusing on the different point.

(Operation: Authenticating Process)

Figure 9:
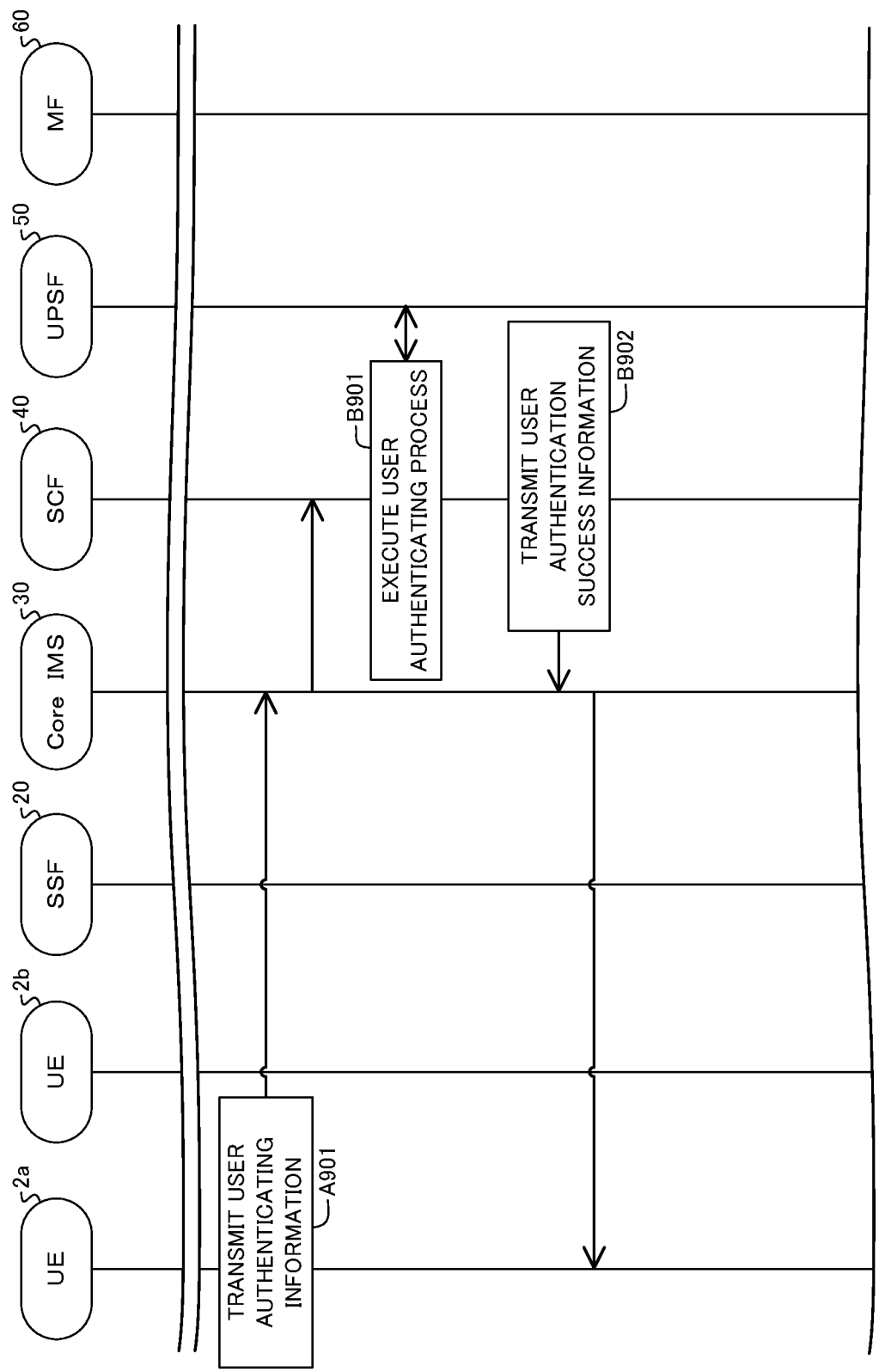
FIG. 9 is a sequence diagram showing an operation of a content delivery system according to a modified example 1 of the first exemplary embodiment when authenticating the user of the user equipment.

After receiving equipment authentication success information from the Core IMS part 30, as shown in FIG. 9, upon accepting an input of user authenticating information, the user equipment 2a of the content delivery system 1 transmits a user authenticating process request including the accepted user authenticating information to the service control functions part 40 via the Core IMS part 30 (step A901).

The service control functions part 40 executes a user authenticating process based on the user authenticating information included in the received user authenticating process request and the user authenticating criterion information stored in the user profile server functions part 50 (step B901). Then, in a case that a user identified with user identifier information is authenticated as a valid user, the service control functions part 40 transmits user authentication success information to the user equipment 2a via the Core IMS part 30 (step B902).

This modified example 1 can also produce like actions and effects as the first exemplary embodiment.

Modified Example 2 of First Exemplary Embodiment

Next, a content delivery system according to a modified example 2 of the first exemplary embodiment of the present invention will be described. The content delivery system according to the modified example 2 is different from the content delivery system according to the first exemplary embodiment in that the portal server 5 (the service selection functions part 20) executes a user authenticating process. Therefore, a description will be made below focusing on the different point.

The portal server 5 and the service control server 4a (the user profile server functions part 50) of the modified example 2 are configured to be capable of communicating with each other.

(Operation: Authenticating Process)

Figure 10:
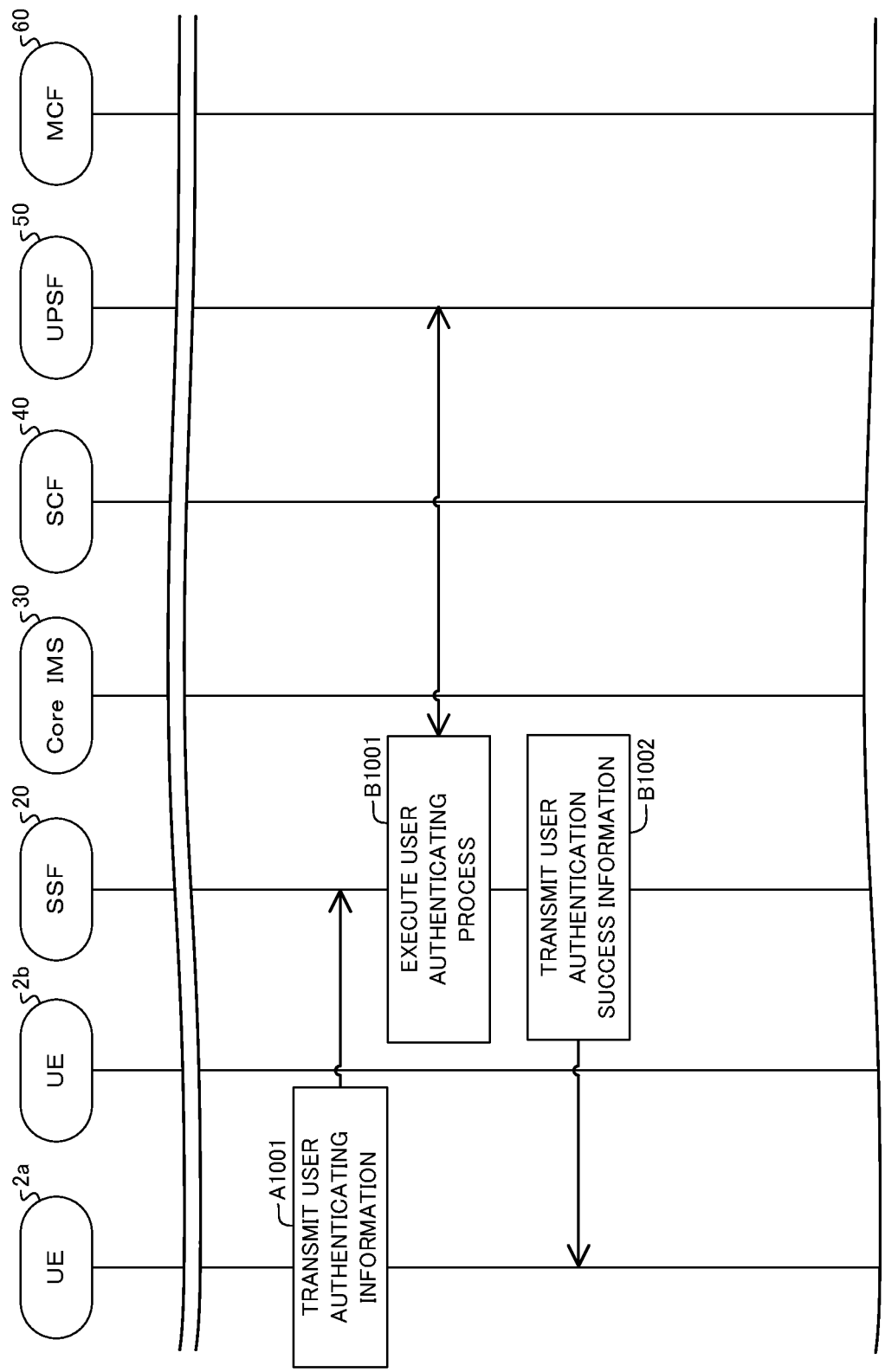
FIG. 10 is a sequence diagram showing an operation of a content delivery system according to a modified example 2 of the first exemplary embodiment when authenticating the user of the user equipment.

After reception of equipment authentication success information from the Core IMS part 30, as shown in FIG. 10, when accepting an input of user authenticating information, the user equipment 2a of the content delivery system 1 transmits a user authenticating process request including the accepted user authenticating information to the portal server 5 (the service selection functions part 20) (step A1001).

The service selection functions part 20 executes a user authenticating process based on the user authenticating information included in the received user authenticating process request and the user authenticating criterion information stored in the user profile server functions part 50 (step B1001). Then, in a case that a user identified with user identifier information is authenticated as a valid user, the service selection functions part 20 transmits user authentication success information to the user equipment 2a (step B1002).

This modified example 2 can also produce like actions and effects as the first exemplary embodiment.

Modified Example 3 of First Exemplary Embodiment

Next, a content delivery system according to a modified example 3 of the first exemplary embodiment of the present invention will be described. The content delivery system according to the modified example 3 is different from the content delivery system according to the first exemplary embodiment in that the user equipment 2a, 2b and the service control server 4a are configured to be capable of transmitting and receiving information directly (not via the Core IMS part 30). Therefore, a description will be made focusing on the different point.

Figure 11:
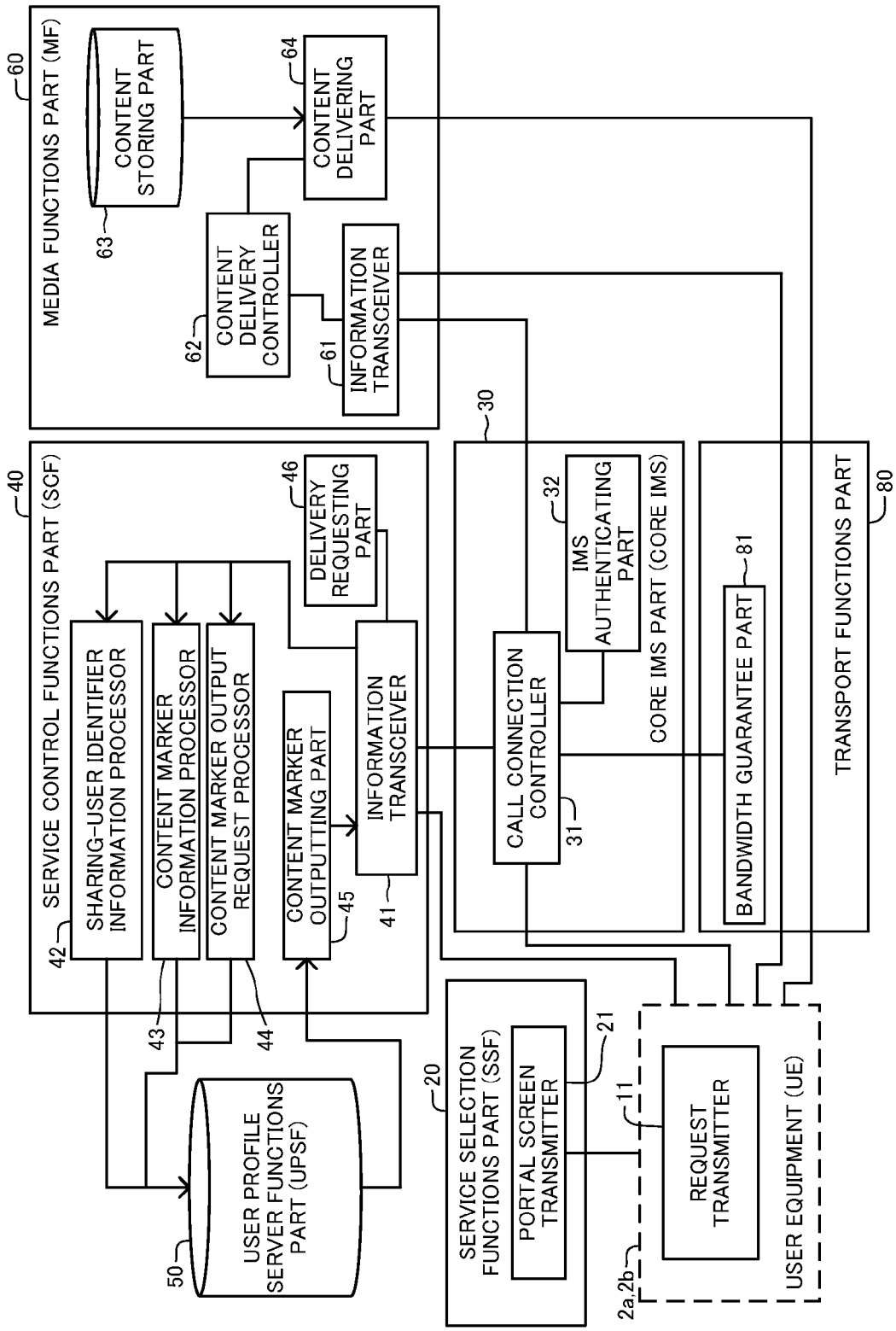
FIG. 11 is a block diagram schematically showing a function of a content delivery system according to a modified example 3 of the first exemplary embodiment.
Figure 12:
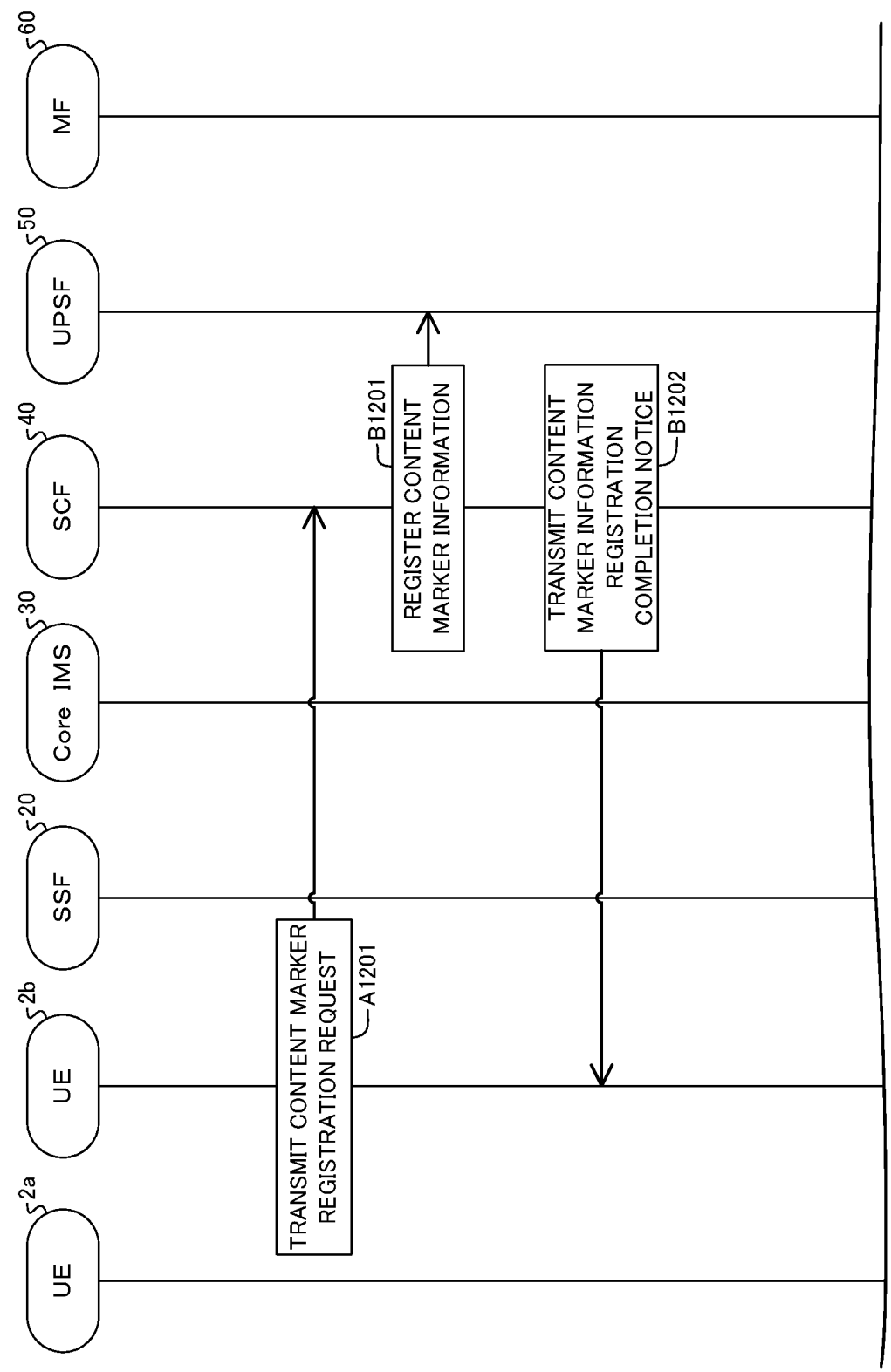
FIG. 12 is a sequence diagram showing an operation of the content delivery system according to the modified example 3 of the first exemplary embodiment when registering content marker information in response to an input by the user of the user equipment.

The information transceiver 41 of the content delivery system 1 transmits a variety of information (requests, instructions, notices, etc.) to the user equipment 2a, 2b not via the Core IMS part 30 as shown in FIG. 11. Moreover, the information transceiver 41 receives a variety of information transmitted by the user equipment 2a, 2b, not via the Core IMS part 30. In this exemplary embodiment, a variety of information is included in an SIP message Therefore, for example, in the first exemplary embodiment described above, at step A601 of FIG. 6, the user equipment 2b transmits a content marker registration request to the service control functions part 40 via the Core IMS part 30. On the other hand, in the modified example 3, at step A1201 of FIG. 12, the user equipment 2b transmits a content marker registration request to the service control functions part 40 directly (not via the Core IMS part 30).

In a like manner, in the first exemplary embodiment described above, at step B602 of FIG. 6, the service control functions part 40 transmits a content marker information registration completion notice to the user equipment 2b via the Core IMS part 30. On the other hand, in the modified example 3, at step B1202 of FIG. 12, the service control functions part 40 transmits a content marker information registration completion notice to the user equipment 2b directly (not via the Core IMS part 30).

Although a content marker registering process has been described as an example herein, other processes are also executed in a like manner.

This modified example 3 can also produce like actions and effects as the first exemplary embodiment described above. Moreover, according to this modified example 3, it is possible to reduce processing load on the connection control system 3 when the connection control system 3 transfers information.

Modified Example 4 of First Exemplary Embodiment

Next, a content delivery system according to a modified example 4 of the first exemplary embodiment of the present invention will be described. The content delivery system according to the modified example 4 is different from the content delivery system according to the first exemplary embodiment in that the user equipment 2a, 2b and the service control server 4a are configured to be capable of transmitting and receiving information via the portal server 5. Therefore, a description will be made below focusing on the different point.

The portal server 5 and the service control server 4a in this content delivery system 1 are configured to be capable of communicating with each other. In this example, the portal server 5 communicates with the service control server 4a by transmission and reception of SIP messages. The user equipment 2a, 2b communicates with the portal server 5 by transmission and reception of HTTP messages.

Figure 13:
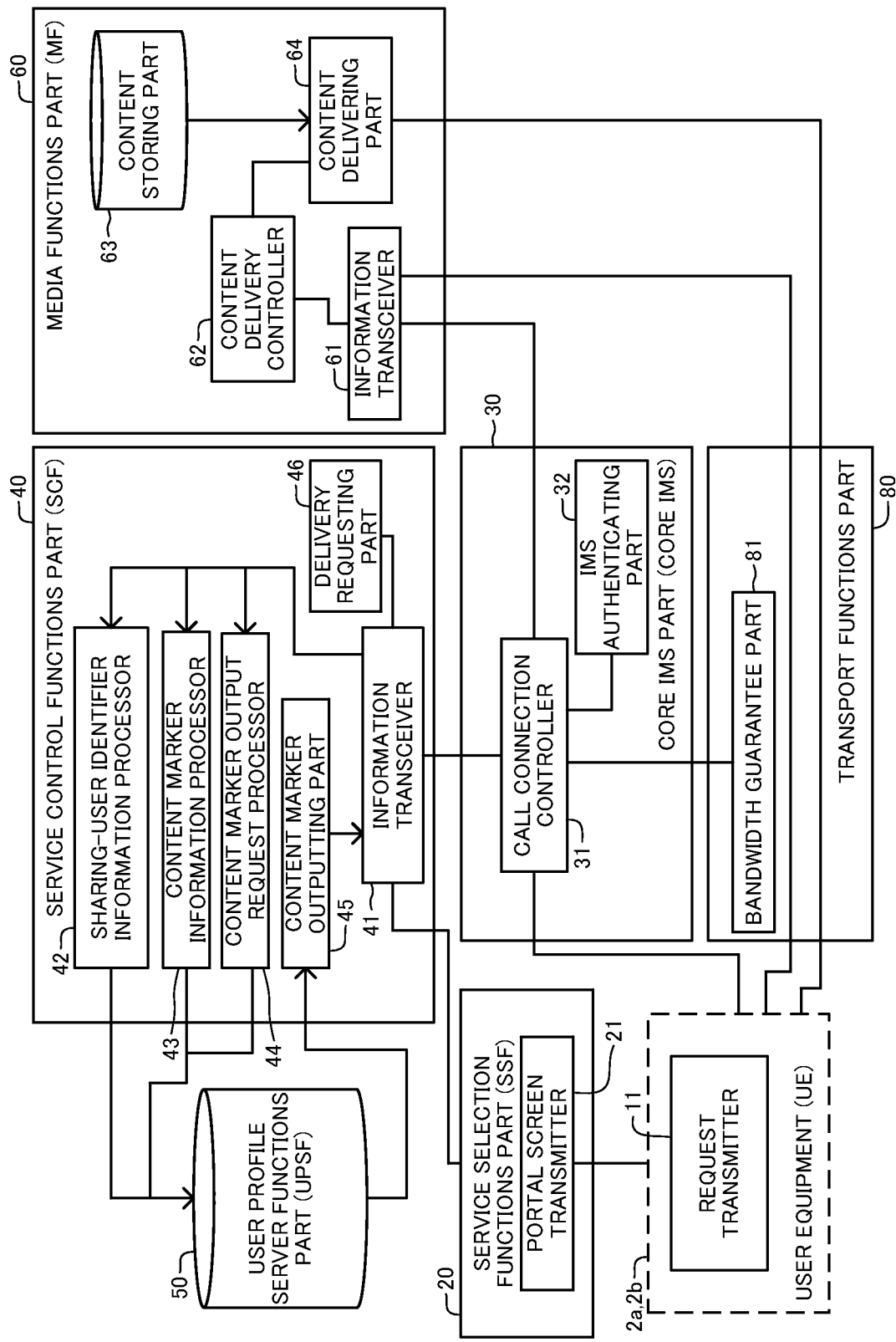
FIG. 13 is a block diagram schematically showing a function of a content delivery system according to a modified example 4 of the first exemplary embodiment.
Figure 14:
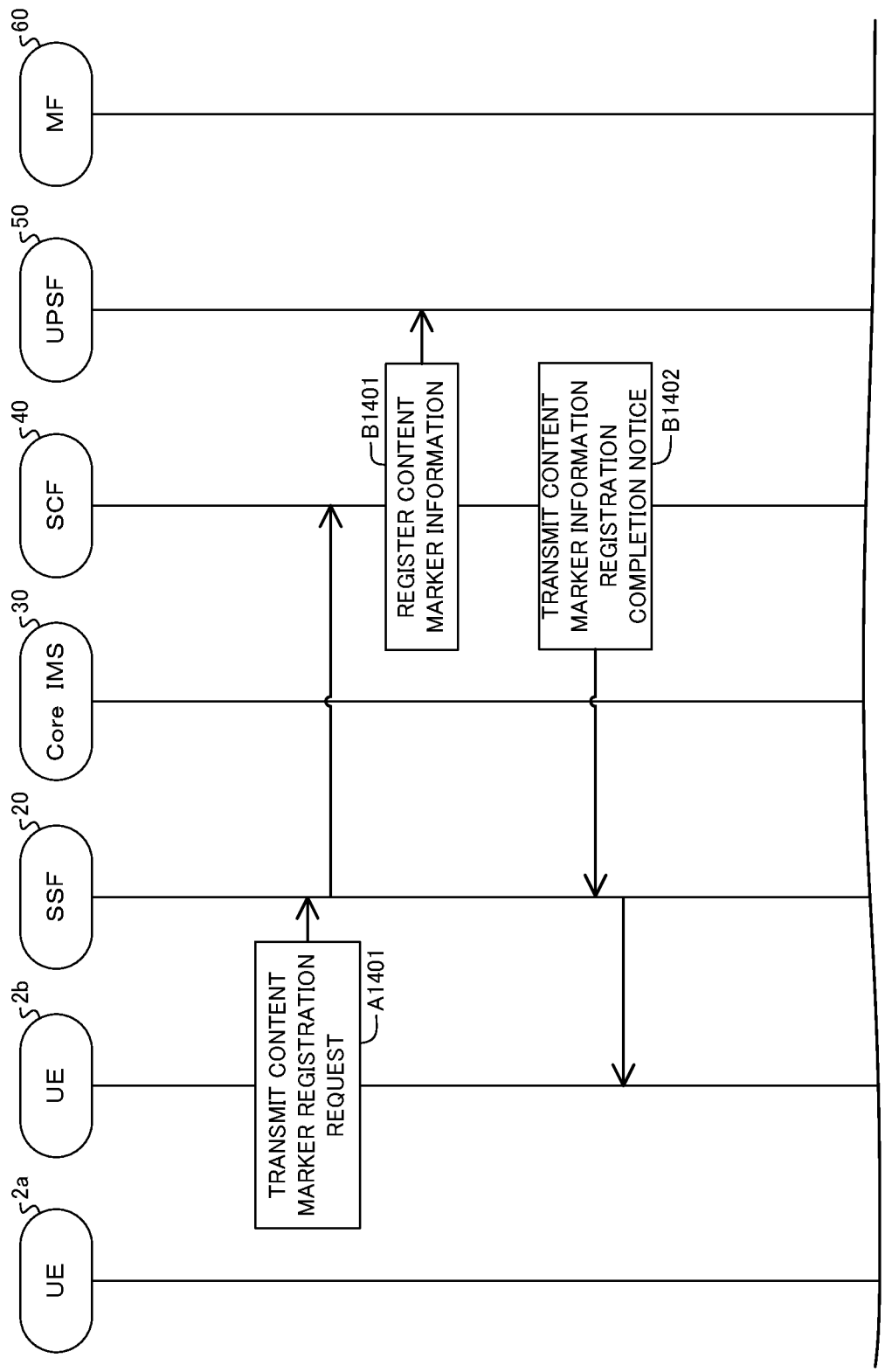
FIG. 14 is a sequence diagram showing an operation of the content delivery system according to the modified example 4 of the first exemplary embodiment when registering content marker information in response to an input by the user of the user equipment.

The information transceiver 41 of this content delivery system 1 transmits a variety of information (requests, instructions, notices, etc.) to the service selection functions part 20 as shown in FIG. 13. Moreover, the information transceiver 41 receives a variety of information transmitted by the service selection functions part 20.

Therefore, for example, in the first exemplary embodiment described above, at step A601 of FIG. 6, the user equipment 2b transmits a content marker registration request to the service control functions part 40 via the Core IMS part 30. On the other hand, in the modified example 4, at step A1401 of FIG. 14, the user equipment 2b transmits a content marker registration request to the service control functions part 40 via the service selection functions part 20.

In a like manner, in the first exemplary embodiment described above, at step B602 of FIG. 6, the service control functions part 40 transmits a content marker information registration completion notice to the user equipment 2b via the Core IMS part 30. On the other hand, in the modified example 4, at step B1402 of FIG. 14, the service control functions part 40 transmits a content marker information registration completion notice to the user equipment 2b via the service selection functions part 20.

Although a content marker registering process has been described as an example herein, other processes are also executed in a like manner.

Further, this modified example 4 can also produce like actions and effects as the first exemplary embodiment described above.

Modified Example 5 of First Exemplary Embodiment

Next, a content delivery system according to a modified example 5 of the first exemplary embodiment of the present invention will be described. The content delivery system according to the modified example 5 is different from the content delivery system according to the first exemplary embodiment in that the portal server 5 is configured to directly perform management of information stored in the user profile server functions part 50. Therefore, a description will be made below focusing on the different point.

The portal server 5 and the service control server 4*a* in this content delivery system 1 are configured to be capable of communicating with each other. In this exemplary embodiment, the portal server 5 communicates with the service control server 4*a* by transmission and reception of SIP messages.

Figure 15:
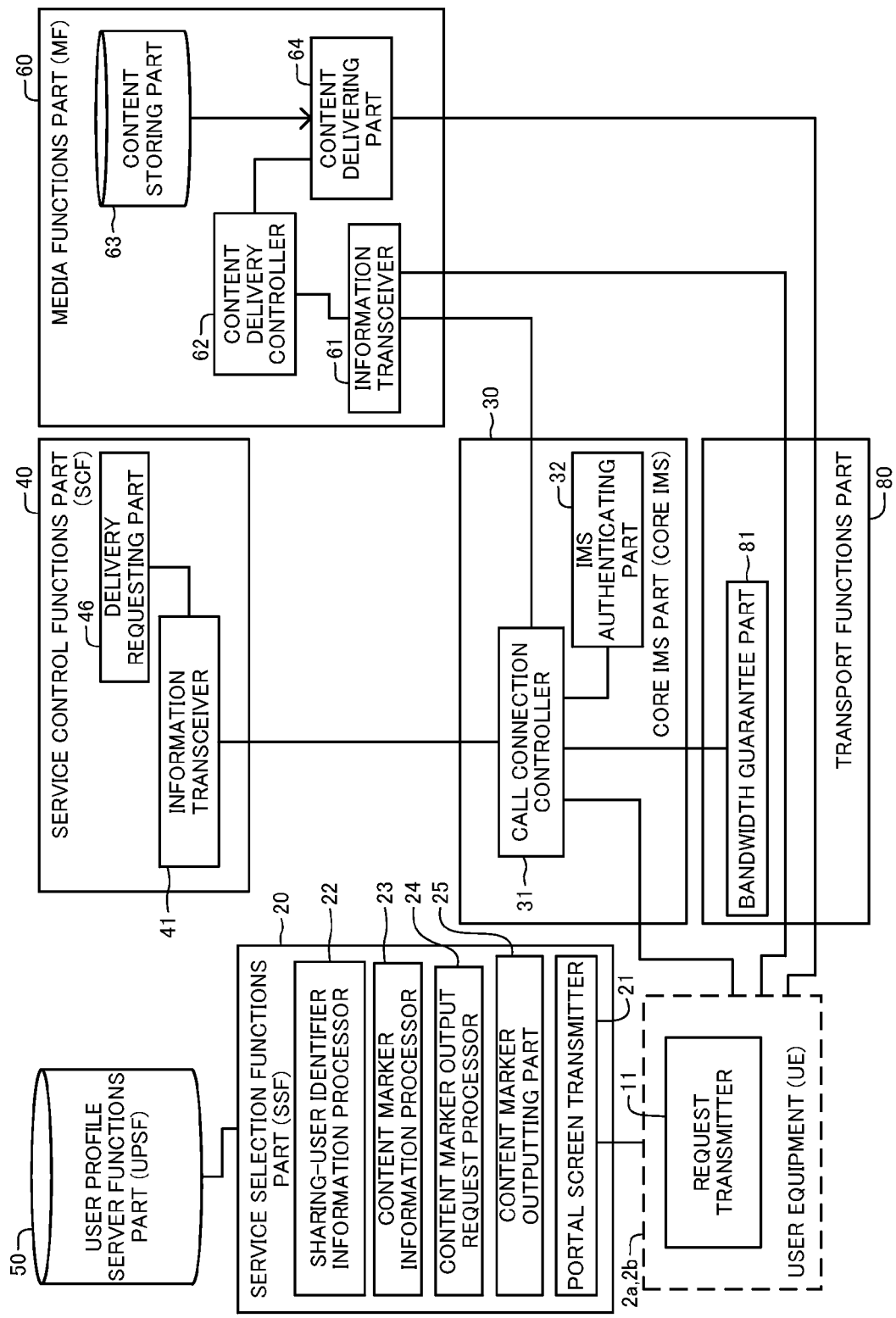
FIG. 15 is a block diagram schematically showing a function of a content delivery system according to a modified example 5 of the first exemplary embodiment.

As shown in FIG. 15, the service selection functions part 20 in this content delivery system 1 includes a sharing-user identifier information processor 22, a content marker information processor 23, a content marker output request processor 24 and a content marker outputting part 25 like the sharing-user identifier information processor 42, the content marker information processor 43, the content marker output request processor 44 and the content marker outputting part 45. On the other hand, the service control functions part 40 does not include the sharing-user identifier information processor 42, the content marker information processor 43, the content marker output request processor 44, or the content marker outputting part 45.

The service selection functions part 20 acquires (reads out) information stored in the user profile server functions part 50. Moreover, the service selection functions part 20 causes the user profile server functions part 50 to newly store information (writes information).

Therefore, for example, in the first exemplary embodiment described above, at step A601 of FIG. 6, the user equipment 2*b* transmits a content marker registration request to the service control functions part 40 via the Core IMS part 30. Moreover, the service control functions part 40 registers content marker information to the user profile server functions part 50.

Figure 16:
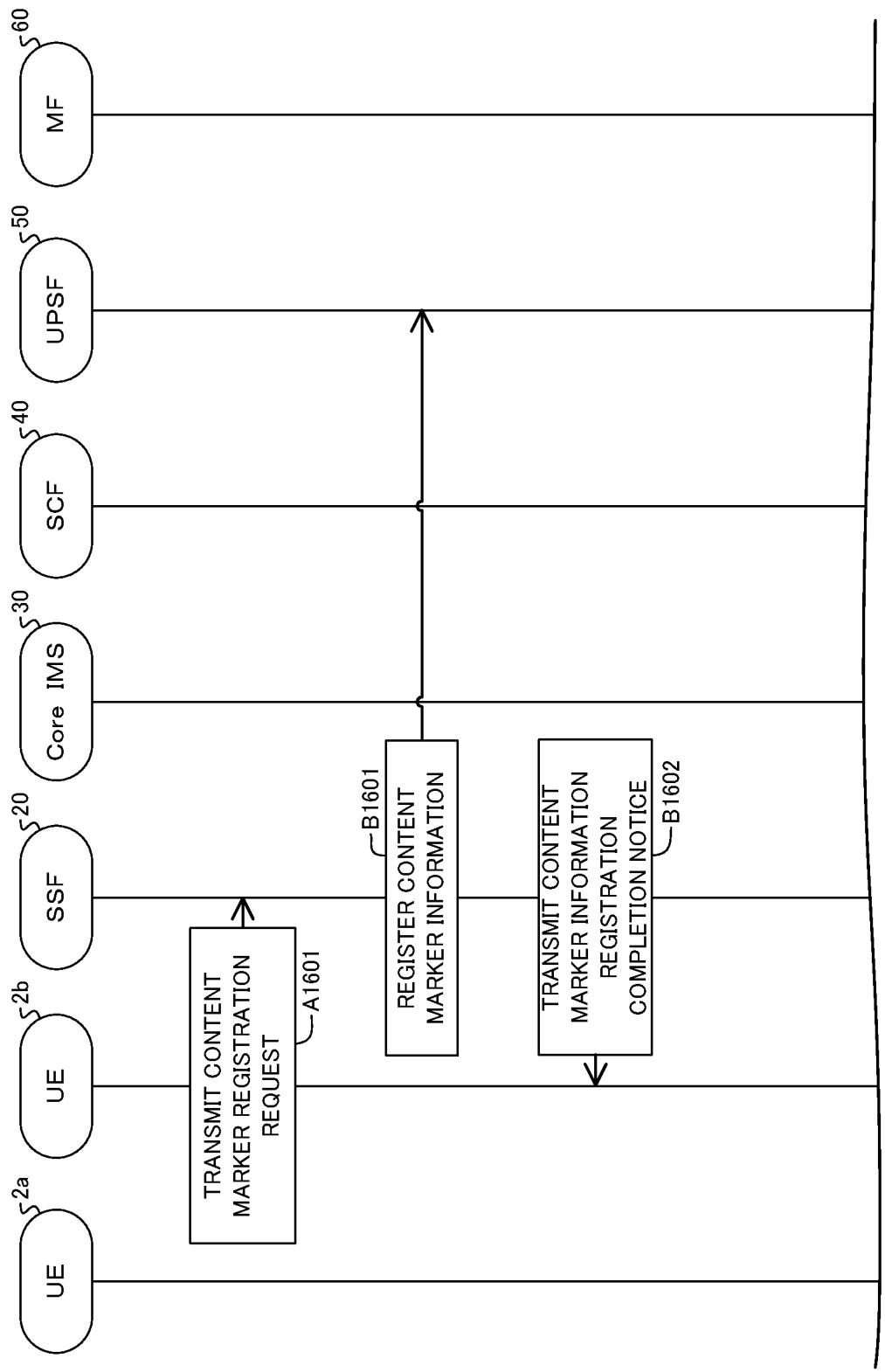
FIG. 16 is a sequence diagram showing an operation of the content delivery system according to the modified example 5 of the first exemplary embodiment when registering content marker information in response to an input by the user of the user equipment.

On the other hand, in the modified example 5, at step A1601 of FIG. 16, the user equipment 2*b* transmits a content marker registration request to the portal server 5 (the service selection functions part 20). Then, the service selection functions part 20 registers the content marker information to the user profile server functions part 50.

Figure 6:
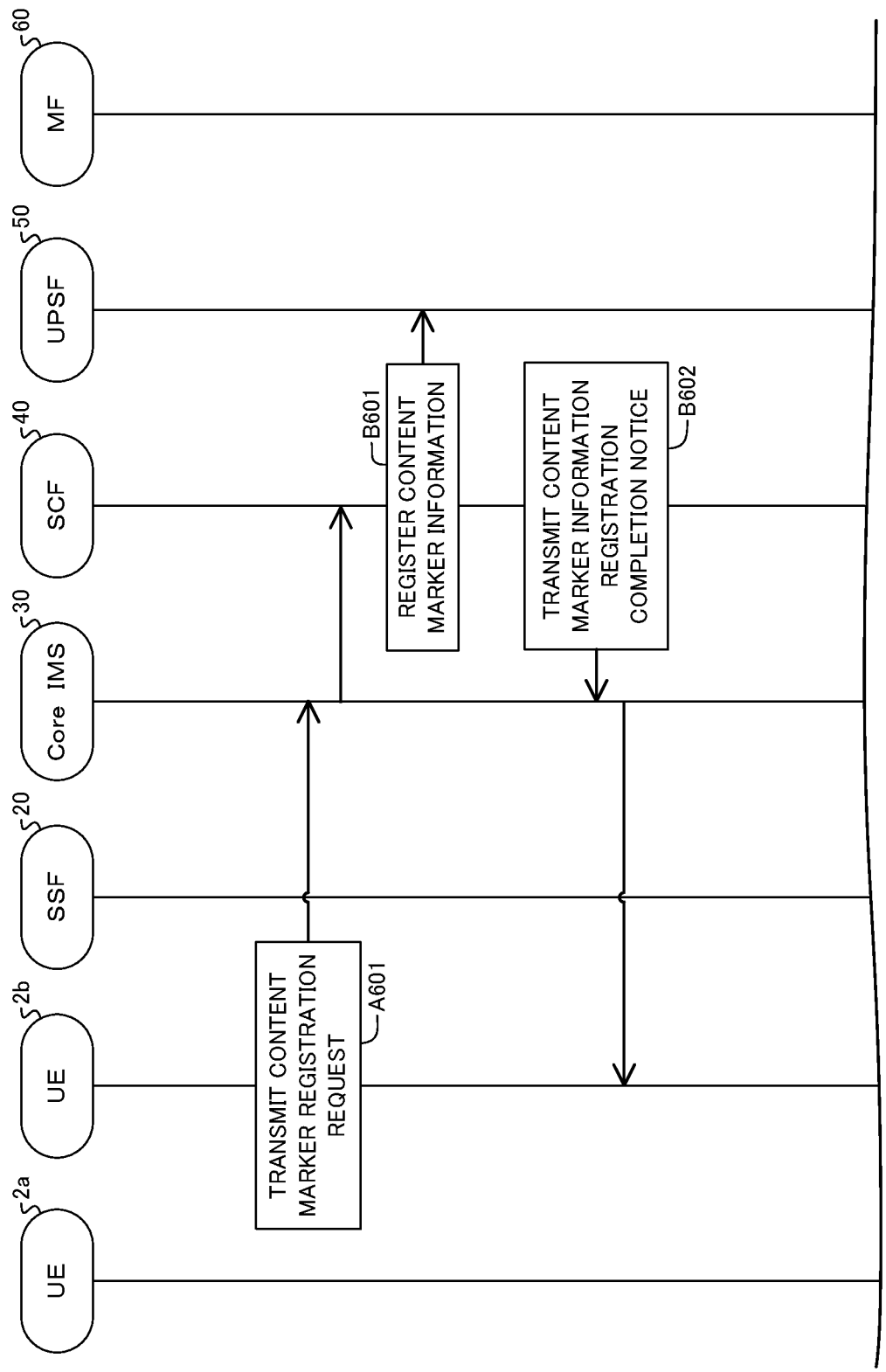
FIG. 6 is a sequence diagram showing an operation of the content delivery system shown in FIG. 1 when registering content marker information in response to an input by the user of the user equipment.

In a like manner, in the first exemplary embodiment, at step B602 of FIG. 6, the service control functions part 40 transmits a content marker information registration completion notice to the user equipment 2*b* via the Core IMS part 30. On the other hand, in the modified example 5, at step B1602 of FIG. 16, the service selection functions part 20 transmits a content marker information registration completion notice to the user equipment 2*b*.

Although a content marker registering process has been described here as an example, other processes are also executed in a like manner.

Further, the modified example 5 can also produce like actions and effects as the first exemplary embodiment.

In the modified example 5, the service selection functions part 20 includes all of the sharing-user identifier information processor, the content marker information processor, the content marker output request processor, and the content marker outputting part. In another modified example, the service selection functions part 20 may include part of the sharing-user identifier information processor, the content marker information processor, the content marker output request processor and the content marker outputting part, whereas the service control functions part 40 may include the rest thereof.

Second Exemplary Embodiment

Next, a content delivery system according to a second exemplary embodiment of the present invention will be described. The content delivery system according to the second exemplary embodiment is different from the content delivery system according to the first exemplary embodiment in that the user profile server functions part 50 does not store sharing-user tables and sharing-user identifier information is included in content marker registration information. Therefore, a description will be made below focusing on the different point.

The user profiles server functions part 50 of the second exemplary embodiment stores a content marker table in association with user identifier information in a like manner as in the first exemplary embodiment. On the other hand, unlike in the first exemplary embodiment, the user profile server functions part 50 does not store a sharing-user table. A content marker table may be stored in the service control functions part 40.

A content marker table is a table including a plurality of content marker registration information. Unlike in the first exemplary embodiment, content marker registration information is composed of content marker information, content marker identifier information for identifying the content marker information, and sharing-user identifier information for identifying a user/users who shares/share the content marker information (Authorized User or Authorized View User). Here, content marker information includes content identifier information for identifying content, a playing start position representing a position to start playing the content, and a playing finish position representing a position to finish playing the content. Content marker registration information may include a plurality of sharing-user identifier information, or may include only empty information as sharing-user identifier information. In a case that content marker registration information include only empty information as sharing-user identifier information, it is represented that there is no user sharing content marker information.

Further, as shown in FIG. 17, the service control functions part 40 includes a content marker registration request accepting part (a content marker information accepting unit and a sharing-user identifier information accepting unit) 47, and a content marker information storing processor (a content marker information storing processing unit) 48, instead of the sharing-user identifier information processor 42 and the content marker information processor 43 of the first exemplary embodiment.

The content marker registration request accepting part 47 accepts a content marker registration request as a process request received by the information transceiver 41. A content marker registration request includes content marker information, user identifier information for identifying the user of the user equipment 2*a*, 2*b* having transmitted the content marker information, and sharing-user identifier information for identifying a user/users who shares/share the content marker information.

The content marker information storing processor 48 updates the content marker table stored in the user profile server functions part 50 based on the content marker registration request accepted by the content marker registration request accepting part 47.

To be specific, when the content marker registration request accepting part 47 accepts the content marker registration request, the content marker information storing processor 48 generates content marker identifier information. Then, the content marker information storing processor 48 adds content marker registration information composed of the content marker information and sharing-user identifier information included in the content marker registration request and the generated content marker identifier information, to a content marker table stored in association with the user identifier information included in the accepted content marker registration request.

That is to say, the content marker information storing processor 48 executes a process of causing the user profile server functions part 50 to store the content marker information, user identifier information and sharing-user identifier information included in the content marker registration request in association with one another.

Further, the content marker outputting part 45 specifies a content marker table stored in association with user identifier information identical to user identifier information included in a content marker output request accepted by the content marker output request processor 44. The content marker outputting part 45 extracts content marker information included in the specified content marker table. That is to say, the content marker outputting part 45 extracts content marker information stored in association with user identifier information identical to the user identifier information included in the accepted content marker output request.

Further, the content marker outputting part 45 extracts content marker registration information including sharing-user identifier information identical to the user identifier information included in the content marker output request accepted by the content marker output request processor 44, from all the content marker registration information stored in the user profile server functions part 50. Then, the content marker outputting part 45 acquires content marker information included in the extracted content marker registration information. That is to say, the content marker outputting part 45 extracts content marker information stored in association with sharing-user identifier information identical to the user identifier information included in the accepted content marker output request.

Then, the content marker outputting part 45 outputs the extracted content marker information.

That it to say, the content marker outputting part 45 extracts content marker information stored in association with user identifier information or sharing-user identifier information identical to the user identifier information included in the accepted content marker output request, and outputs the extracted content marker information.

(Operation: Sharing-User Editing Process)

Further, the content delivery system 1 according to the second exemplary embodiment is configured to edit (add, change, or delete) a user/users who shares/share content marker information having been already registered, in response to an input by the user of the user equipment 2a, 2b.

Below, an operation of the content delivery system 1 when the content delivery system 1 changes a user/users who shares/share content marker information in response to an input by the user UB of the user equipment 2b will be described with reference to a sequence diagram of FIG. 17.

In a state that a list of content marker information is displayed on the television, the user UB of the user equipment 2b selects content marker information, and inputs content marker identifier information for identifying the selected content marker information, and sharing-user identifier information as information for identifying a user with who the user UB wants to newly share the content marker information (i.e., sharing-user identifier information after change).

Consequently, the user equipment 2b transmits a content marker edition request as a process request including the inputted content marker identifier information, user authentication success information as user identifier information for identifying the user UB, equipment address information and the sharing-user identifier information after change, to the service control functions part 40 via the Core IMS part 30 (step A1801).

Consequently, the service control functions part 40 receives the content marker edition request. Next, the service control functions part 40 specifies a content marker table stored in association with the user identifier information included in the received content marker edition request, among the content marker tables stored in the user profile server functions part 50.

Then, the service control functions part 40 specifies content marker registration information stored in association with the content marker identifier information included in the received content marker edition request, among content marker registration information stored in the specified content marker table. Moreover, the service control functions part 40 changes sharing-user identifier information included in the specified content marker registration information to the sharing-user identifier information after change included in the received content marker edition request (step B1801).

Then, the service control functions part 40 transmits a content marker edition completion notice to the user equipment 2b via the Core IMS part 30 (step B1802). A content marker edition completion notice is a notice representing that edition of content marker registration information has been completed. Then, upon reception of the content marker edition completion notice, the user equipment 2b causes the not-shown television to display an image representing that edition of the content marker registration information has been completed.

The content delivery system 1 configured as described above operates in a like manner as the content delivery system 1 according to the first exemplary embodiment. Unlike in the first exemplary embodiment, the operation of the content delivery system according to the second exemplary embodiment does not include an operation of previously registering sharing-user identifier information for identifying a user/users who shares/share content marker information (FIG. 4).

This second exemplary embodiment can also produce like actions and effects as the first exemplary embodiment.

In a modified example of the second exemplary embodiment, sharing-user identifier information may include sharing-group identifier information for identifying a group including a plurality of users. In this case, it is preferred that the user profile server functions part 50 stores sharing-group identifier information and user identifier information for identifying each of the users included in the group identified with the sharing-group identifier information in association with each other.

Further, in the second exemplary embodiment, the content marker outputting part 45 is configured to extract content marker registration information including sharing-user identifier information identical to user identifier information included in a content marker output request among all the content marker registration information stored in the user profile server functions part 50, and acquire content marker information included in the extracted content marker registration information.

In a modified example of the second exemplary embodiment, the service control functions part 40 may be configured to store user identifier information and user identifier information (sharing-permitted-user identifier information (Source User)) associated with a content marker table including content marker registration information including sharing-user identifier information identical to the aforementioned user identifier information in association with each other. In this case, the content marker outputting part 45 is configured to acquire sharing-permitted-user identifier information associated with user identifier information included in a content marker output request, and acquire content marker registration information included in a content marker table associated with user identifier information identical to the acquired sharing-permitted-user identifier information. Moreover, the content marker outputting part 45 is configured to extract content marker registration information including sharing-user identifier information identical to user identifier information included in the content marker output request among the acquired content marker registration information, and acquire content marker information included in the extracted content marker registration information.

According to this modified example, as compared with extracting content marker registration information including sharing-user identifier information identical to user identifier information included in a content marker output request from all the content marker registration information stored in the user profile server functions part 50, it is possible to reduce processing load on the service control functions part 40, and also possible to extract content marker registration information at higher speeds.

Third Exemplary Embodiment

Next, a content delivery system according to a third exemplary embodiment of the present invention will be described. The content delivery system according to the third exemplary embodiment is different from the content delivery system 1 according to the second exemplary embodiment in that a sharing-user table including sharing-user identifier information as a default value of sharing-user identifier information included in content marker registration information is stored in the service control functions part 40. Therefore, a description will be made below focusing on the different point.

Unlike in the second exemplary embodiment described above, the user profile server functions part 50 according to the third exemplary embodiment stores a sharing-user table in association with user identifier information. Moreover, the service control functions part 40 stores a content marker table in association with user identifier information as in the second exemplary embodiment. Both the content marker table and the sharing-user table may be stored in one of the service control functions part 40 and the user profile server functions part 50.

A content marker table is a table including a plurality of content marker registration information. As in the second exemplary embodiment, content marker registration information is composed of content marker information, content marker identifier information for identifying the content marker information, and sharing-user identifier information for identifying a user/users who shares/share the content marker information. Here, content marker information includes content identifier information for identifying content, a playing start position representing a position to start playing the content, and a playing finish position representing a position to finish playing the content. Content marker registration information may include a plurality of sharing-user identifier information, or may include only empty information as sharing-user identifier information. In a case that content marker registration information includes only empty information as sharing-user identifier information, it is represented that there is no user sharing content marker information.

Further, a sharing-user table is a table including sharing-user identifier information for identifying a user/users who shares/share content marker information (Authorized User or Authorized View User). A sharing-user table may include one piece of sharing-user identifier information, or may include a plurality of sharing-user identifier information. In a case that a sharing-user table does not include sharing-user identifier information (includes only empty information), it is represented that there is no user sharing content marker information.

The content marker information processor 43 accepts a content marker registration request as a process request received by the information transceiver 41. A content marker registration request includes sharing permission information, content marker information, and user identifier information for identifying the user of the user equipment 2a, 2b. Then, the content marker information processor 43 updates a content marker table stored in the service control functions part 40 based on the accepted content marker registration request.

To be specific, the content marker information processor 43 specifies a content marker table stored in association with the user identifier information included in the content marker registration request, among the content marker tables stored in the service control functions part 40.

Further, in a case that the sharing permission information included in the content marker registration request represents permission of sharing of the content marker information with another user, the content marker information processor 43 specifies a sharing-user table stored in association with the user identifier information included in the content marker registration request among the sharing-user tables stored in the user profile server functions part 50.

Furthermore, the content marker information processor 43 acquires the sharing-user identifier information included in the specified sharing-user table. Then, the content marker information processor 43 generates content marker identifier information. Moreover, the content marker information processor 43 adds content marker registration information, which is composed of the content marker information included in the content marker registration request, the generated content marker identifier information and the acquired sharing-user identifier information, to the specified content marker table.

That is to say, in a case that the sharing permission information included in the accepted content marker registration request represents permission of sharing of content marker information with another user, the content marker information processor 43 executes a process of causing the service control functions part 40 to store the content marker information and user identifier information included in the content marker registration request, in association with each other.

In a case that sharing permission information included in a content marker registration request represents that sharing content marker information with another user, and/or in a case that sharing-user identifier information is not included in a sharing-user table associated with user identifier information included in a content marker registration request, the content marker information processor 43 generates content marker identifier information. Moreover, the content marker information processor 43 adds content marker registration information, which is composed of the content marker information included in the content marker registration request, the generated content marker identifier information, and empty information as sharing-user identifier information, to the specified content marker table.

That is to say, in a case that sharing permission information included in the accepted content marker registration request represents that it is not permitted to share content marker information with another user, the content marker information processor 43 executes a process of causing the service control functions part 40 to store content marker information and user identifier information included in the content marker registration request in association with each other.

Further, the content marker outputting part 45 specifies a content marker table stored in association with user identifier information identical to the user identifier information included in the content marker output request accepted by the content marker output request processor 44. The content marker outputting part 45 extracts content marker information included in the specified content marker table. That is to say, the content marker outputting part 45 extracts content marker information stored in association with user identifier information identical to the user identifier information included in the accepted content marker output request.

Furthermore, the content marker outputting part 45 extracts content marker registration information including sharing-user identifier information identical to the user identifier information included in the content marker output request accepted by the content marker output request processor 44 from all the content marker registration information stored in the service control functions part 40. Then, the content marker outputting part 45 acquires content marker information included in the extracted content marker registration information. That is to say, the content marker outputting part 45 extracts content marker information stored in association with sharing-user identifier information identical to the user identifier information included in the accepted content marker output request.

Then, the content marker outputting part 45 outputs the extracted content marker information.

That is to say, the content marker outputting part 45 extracts content marker information stored in association with user identifier information or sharing-user identifier information identical to the user identifier information included in the accepted content marker output request, and outputs the extracted content marker information.

The content delivery system 1 configured as described above operates in a like manner as the content delivery system 1 of the first embodiment.

This third exemplary embodiment can also produce like actions and effects as in the first exemplary embodiment.

Further, according to the third exemplary embodiment, sharing-user identifier information registered in the sharing-user table is used as a default value of the sharing-user identifier information included in the content marker registration information, and therefore, it is possible to save time to input user identifier information every time the user transmits a content marker registration request. That is to say, it is possible to increase the convenience of the users.

Fourth Exemplary Embodiment

Next, a content delivery system according to a fourth exemplary embodiment of the present invention will be described with reference to FIG. 19.

A function of the content delivery system 1 according to the fourth exemplary embodiment includes a content marker information accepting part 101, a content marker information storing processor 102, a sharing-user identifier information accepting part 103, a content marker output request accepting part 104, and a content marker outputting part 105.

The content marker information accepting part 101 accepts content marker information including content identifier information for identifying content.

The content marker information storing processor 102 executes a process of causing a storing device RC to store the content marker information accepted by the content marker information accepting part 101.

The sharing-user identifier information accepting part 103 accepts sharing-user identifier information for identifying a user/users who shares/share the content marker information stored in the storing device RC.

The content marker output request accepting part 104 accepts a content marker output request that includes user identifier information for identifying a user and that requests an output of the content marker information Based on user identifier information included in the content marker output request accepted by the content marker output request accepting part 104 and sharing-user identifier information accepted by the sharing-user identifier information accepting part 103, the content marker outputting part 105 extracts content marker information corresponding to the user identifier information from the content marker information stored in the storing device RC. Moreover, the content marker outputting part 105 outputs the extracted content marker information.

Also in this fourth exemplary embodiment, when accepting a content marker output request from a first user, the content delivery system 1 can transmit content marker information set to be shared with the first user among content marker information registered by another user, to user equipment used by the first user. As a result, it is possible to let only the first user (a specific user) view content marker information registered by a user other than the first user. That is to say, it is possible to increase the convenience of users.

In this case, it is preferred that:
the content delivery system includes an application server system and a connection control system;
the connection control system is configured to receive equipment specification information transmitted by user equipment and establish a connection between the application server system and the user equipment based on the received equipment specification information; and
the application server system is configured to transmit content data representing content to the user equipment with the connection established by the connection control system.

In this case, it is preferred that:
the content marker output request accepting unit is configured to accept the content marker output request by receiving the content marker output request transmitted by the user equipment; and
a content marker transmitting unit configured to transmit the content marker information outputted by the content marker outputting unit to the user equipment having transmitted the content marker output request is included.

In this case, it is preferred that:
the connection control system is configured to receive user authenticating information transmitted by the user equipment and inputted by a user of the user equipment;
the content delivery system comprises:
a user authenticating criterion information storing unit configured to previously store user authenticating criterion information; and
a user authenticating unit configured to determine whether or not the user authenticating information received by the connection control system is corresponding to the user authenticating criterion information stored in the user authenticating criterion information storing unit, and thereby determine whether the user having inputted the user authenticating information is a valid user or not; and
the content marker output request accepting unit is configured to accept the content marker output request including user identifier information for identifying the user authenticated as a valid user by the user authenticating unit.

According to this, the content delivery system accepts a content marker output request including user identifier information for identifying a user authenticated as a valid user. Consequently, it is possible to prevent the content delivery system from executing a process based on a content marker output request transmitted by a user who is not authenticated as a valid user. As a result, it is possible to prevent an invalid user from viewing content marker information.

In this case, it is preferred that the application server system is configured to receive a content viewing request that is transmitted by the user equipment and that includes the content marker information, and transmit content data representing content identified by the content marker information included in the received content viewing request to the user equipment.

According to this, a user of user equipment can view content that the user wants to view without performing a cumbersome operation for specifying the content. As a result, it is possible to increase the convenience of users.

In this case, it is preferred that:
the content delivery system includes a sharing-user identifier information storing processing unit configured to execute a process of causing the storing device to store the accepted sharing-user identifier information and user identifier information for identifying a user of user equipment having transmitted the sharing-user identifier information in association with each other;
the content marker information accepting unit is configured to accept a content marker registration request that includes sharing permission information representing whether to permit sharing of content marker information with another user, the content marker information, and user identifier information for identifying a user of user equipment having transmitted the content marker information;
the content marker information storing processing unit is configured to execute a process of causing the storing device to store the content marker information and the user identifier information included in the accepted content marker registration request in association with each other and, in a case that the sharing permission information included in the content marker registration request represents permission of sharing of content marker information with another user, further causing the storing device to store user identifier information identical to sharing-user identifier information stored in association with the user identifier information included in the accepted content marker registration request and the content marker information in association with each other; and
the content marker outputting unit is configured to extract the content marker information stored in association with the user identifier information identical to the user identifier information included in the accepted content marker output request, and output the extracted content marker information.

Further, it is preferred that:
the content delivery system of another exemplary embodiment of the present invention includes a content marker registration request accepting unit, which is a unit composing the content marker information accepting unit and the sharing-user identifier information accepting unit, and which is a unit configured to accept a content marker registration request including content marker information, user identifier information for identifying a user of user equipment having transmitted the content marker information and the sharing-user identifier information;
the content marker information storing processing unit is configured to execute a process of causing the storing device to store the content marker information, the user identifier information and the sharing-user identifier information included in the accepted content marker registration request in association with one another; and
the content marker outputting unit is configured to extract content marker information stored in association with user identifier information or sharing-user identifier information identical to the user identifier information included in the accepted content marker output request.

Further, it is preferred that:
the content delivery system according to another exemplary embodiment of the present invention includes a sharing-user identifier information storing processing unit configured to execute the process of causing the storing device to store the accepted sharing-user identifier information and user identifier information for identifying a user of user equipment having transmitted the sharing-user identifier information in association with each other;
the content marker information accepting unit is configured to accept a content marker registration request that includes sharing permission information representing whether to permit sharing of content marker information with another user, the content marker information, and user identifier information for identifying a user of user equipment having transmitted the content marker information;
the content marker information storing processing unit is configured to execute a process of, in a case that the sharing permission information included in the accepted content marker registration request represents sharing of content marker information with another user is not permitted, causing the storing device to store the content marker information and the user identifier information included in the content marker registration request in association with each other, whereas, in a case that the sharing permission information represents sharing of content marker information with another user is permitted, causing the storing device to store the content marker information included in the content marker registration request, the user identifier information included in the content marker registration request and sharing-user identifier information stored in association with the user identifier information, in association with one another; and
the content marker outputting unit is configured to extract content marker information stored in association with user identifier information or sharing-user identifier information identical to the user identifier information included in the accepted content marker output request, and output the extracted content marker information.

Further, a content delivery system of another exemplary embodiment of the present invention includes an application server system and a connection control system.

Furthermore, the connection control system includes a Core IMS (Internet Protocol Multimedia Subsystem) part configured to receive equipment specification information transmitted by user equipment and establish a connection between the application server system and the user equipment based on the received equipment specification information.

In addition, the application server system includes:
a media functions part configured to transmit content data representing content to the user equipment with the connection established by the connection control system;
a service control functions part configured to control a service provided by the media functions part; and
a user profile server functions part configured to store profile information of a user of the user equipment.

Besides, the application server system includes:
a content marker information accepting unit configured to accept content marker information, which is information transmitted by the user equipment and information including content identifier information for identifying content, by receiving the content marker information via the Core IMS part;
a content marker information storing processing unit configured to execute a process of causing the user profile server functions part or the service control functions part to store the accepted content marker information;
a sharing-user identifier information accepting unit configured to accept sharing-user identifier information, which is information transmitted by the user equipment and information for identifying a user/users who shares/share the stored content marker information, by receiving the sharing-user identifier information via the Core IMS part;
a content marker output request accepting unit configured to accept a content marker output request, which is information transmitted by the user equipment and information including user identifier information for identifying a user and requesting for an output of content marker information, by receiving the content marker output request via the Core IMS part;
a content marker outputting unit configured to, based on the user identifier information included in the accepted content marker output request and the accepted sharing-user identifier information, extract content marker information corresponding to the user identifier information from the stored content marker information, and output the extracted content marker information; and
a content marker transmitting unit configured to transmit the outputted content marker information to the user equipment having transmitted the content marker output request via the Core IMS part.

Further, a content delivery method of another exemplary embodiment of the present invention is a method including:
accepting content marker information including content identifier information for identifying content;
executing a process of causing a storing device to store the accepted content marker information;
accepting sharing-user identifier information for identifying a user/users who shares/share the stored content marker information;
accepting a content marker output request including user identifier information for identifying a user and requesting for an output of content marker information; and
based on the user identifier information included in the accepted content marker output request and the accepted sharing-user identifier information, extracting content marker information corresponding to the user identifier information from the stored content marker information, and outputting the extracted content marker information.

In this case, it is preferred that the content delivery method includes:
receiving equipment specification information transmitted by user equipment and establishing a connection between an application server system and the user equipment based on the received equipment specification information, by a connection control system; and
transmitting content data representing content to the user equipment with the connection established by the connection control system, by the application server system.

Further, an application server system of another exemplary embodiment of the present invention includes:
a content marker information accepting unit configured to accept content marker information including content identifier information for identifying content;
a content marker information storing processing unit configured to execute a process of causing a storing device to store the accepted content marker information;
a sharing-user identifier information accepting unit configured to accept sharing-user identifier information for identifying a user/users who shares/share the stored content marker information;
a content marker output request accepting unit configured to accept a content marker output request including user identifier information for identifying a user and requesting for an output of content marker information; and
a content marker outputting unit configured to, based on the user identifier information included in the accepted content marker output request and the accepted sharing-user identifier information, extract content marker information corresponding to the user identifier information from the stored content marker information, and output the extracted content marker information.

In this case, it is preferred that the application server system is configured to transmit content data representing content to the user equipment with the connection established by a connection control system.

Further, a computer program of another exemplary embodiment of the present invention includes instructions for causing an application server system to realize:
a content marker information accepting unit configured to accept content marker information including content identifier information for identifying content;
a content marker information storing processing unit configured to execute a process of causing a storing device to store the accepted content marker information;
a sharing-user identifier information accepting unit configured to accept sharing-user identifier information for identifying a user/users who shares/share the stored content marker information;
a content marker output request accepting unit configured to accept a content marker output request including user identifier information for identifying a user and requesting for an output of content marker information; and
a content marker outputting unit configured to, based on the user identifier information included in the accepted content marker output request and the accepted sharing-user identifier information, extract content marker information corresponding to the user identifier information from the stored content marker information, and output the extracted content marker information.

In this case, it is preferred that the computer program further includes instructions for causing the application server system to transmit content data representing content to the user equipment with the connection established by a connection control system.

The inventions of the content delivery method, the application server system and the computer program having the aforementioned configurations also have like actions as the invention of the abovementioned content delivery system, and therefore, can achieve the object of the present invention mentioned above.

Although the present invention has been described with reference to the respective embodiments described above, the present invention is not limited to the aforementioned embodiments. The configurations and details of the present invention can be altered in various manners that can be understood by those skilled in the art within the scope of the present invention.

Further, in the modified examples of the respective embodiments, content marker registration information may include registering user identifier information for identifying a user having registered content marker information. In this case, it is preferred that the user equipment 2a and 2b are configured to, when displaying a list of content marker information, also display registering user identifier information for identifying a user having registered each content marker information.

Further, each of the modified examples of the respective embodiments may be provided with, instead of the service control server 4a and the media server 4b, a server having both the functions of the service control server 4a and the media server 4b.

Further, although the media server 4b has all of the media functions part 60 in the respective exemplary embodiments, a first server may have part (a media control functions part) of the media functions part 60 and a second server may have the rest (a media delivery functions part) of the media functions part 60.

Furthermore, in the modified examples of the respective embodiments, the application server system 4 may include the portal server 5. Moreover, the service control server 4a or the media server 4b may have the function of the portal server 5.

Further, each of the modified examples of the respective embodiments may be provided with a plurality of servers each having the media delivery functions part of the media functions part 60.

Further, in the modified examples of the respective embodiments, the connection control system 3 includes a plurality of connection control servers (the connection control servers 3a, 3b, etc.), but may include only one connection control server.

In the respective embodiments, each of the user equipment 2a and 2b is a set top box, but may be a mobile phone, a PDA (Personal Data Assistance), a smartphone, a PHS (Personal Handyphone System), a game machine, a car navigation device, a personal computer, or the like.

Moreover, in the respective embodiments, content is a moving image, but may by only an image or only sound.

A content marker table, sharing-user identifier information, sharing-permitted-user identifier information and a sharing-user table in the respective embodiments may be stored as information to be deleted (Action Data) in a case that a predetermined condition is satisfied (e.g., in a case that a preset time has elapsed, or in a case that content has become more than a preset capacity), or may be stored as information to be edited (added, changed, or deleted) (User Profile) only in accordance with an instruction by a controller or a user of the content delivery system 1. Moreover, a sharing-user table in the respective embodiments may also be stored as Action Data, or may be stored as User Profile.

Further, in the respective embodiments, the components of the content delivery system 1 are expressed as components that compose an IMS (IP Multimedia Subsystem), but may be expressed as components that compose an MMS (Multimedia Messaging Service).

Further, in a case that the content delivery system 1 is applied to a VoD system, content marker information may be referred to as "Available CoD." Moreover, in a case that the content delivery system 1 is applied to a BC system, content marker information may be referred to as "BC Content markers." Additionally, in a case that the content delivery system 1 is applied to an nPVR system, content marker information may be referred to as "N-PVR items."

The present invention is based upon and claims the benefit of priority from Japanese patent application No. 2008-231759, filed on Sep. 10, 2008, the disclosure of which is incorporated herein in its entirety by reference.

The present invention can be applied to a video-on-demand system that delivers content via an IP network, an IPTV system that gives a TV broadcast via an IP network, and the like.

The invention claimed is:

1. A content delivery system, comprising an application server system and a connection control system, wherein:
   the connection control system includes an IMS (Internet Protocol Multimedia Subsystem) part configured to receive equipment specification information transmitted by user equipment and establish a connection between the application server system and the user equipment based on the received equipment specification information;
   the application server system includes:
      a media functions part configured to transmit content data representing content to the user equipment with the connection established by the connection control system;
      a service control functions part configured to control a service provided by the media functions part; and
      a user profile server functions part configured to store profile information of a user of the user equipment; and
   the application server system further includes:
      a content marker information accepting unit configured to accept content marker information, which is information transmitted by the user equipment and information including content identifier information for identifying content, by receiving the content marker information via the IMS part;
      a content marker information storing processing unit configured to execute a process of causing the user profile server functions part or the service control functions part to store the accepted content marker information;
      a sharing-user identifier information accepting unit configured to accept sharing-user identifier information, which is information transmitted by the user equipment and information for identifying a user/users who shares/share the stored content marker information, by receiving the sharing-user identifier information via the IMS part;
      a sharing-user identifier information storing processing unit configured to execute a process of causing the storing device to store the accepted sharing-user identifier information and user identifier information for identifying a user of user equipment having transmitted the sharing-user identifier information in association with each other,
a content marker output request accepting unit configured to accept a content marker output request, which is information transmitted by the user equipment and information including user identifier information for identifying a user and requesting for an output of content marker information, by receiving the content marker output request via the IMS part;
a content marker outputting unit configured to, based on the user identifier information included in the accepted content marker output request and the accepted sharing-user identifier information, extract content marker information corresponding to the user identifier information from the stored content marker information, and output the extracted content marker information; and
a content marker transmitting unit configured to transmit the outputted content marker information to the user equipment having transmitted the content marker output request via the IMS part;
the content marker information accepting unit is configured to accept sharing permission information representing whether to permit sharing of content marker information with another user, the content marker information, and user identifier information for identifying a user of user equipment having transmitted the content marker information;
the content marker information storing processing unit is configured to execute a process of causing the storing device to store the accepted content marker information and the user identifier information in association with each other and, in a case that the accepted sharing permission information represents permission of sharing of content marker information with another user, further causing the storing device to store user identifier information identical to sharing-user identifier information stored in association with the user identifier information and the content marker information in association with each other; and
the content marker outputting unit is configured to extract the content marker information stored in association with the user identifier information identical to the user identifier information included in the accepted content marker output request, and output the extracted content marker information.

2. A content delivery system, comprising an application server system and a connection control system, wherein:
the connection control system includes an IMS (Internet Protocol Multimedia Subsystem) part configured to receive equipment specification information transmitted by user equipment and establish a connection between the application server system and the user equipment based on the received equipment specification information;
the application server system includes:
a media functions part configured to transmit content data representing content to the user equipment with the connection established by the connection control system;
a service control functions part configured to control a service provided by the media functions part; and
a user profile server functions part configured to store profile information of a user of the user equipment; and the application server system further includes:
a content marker information accepting unit configured to accept content marker information, which is information transmitted by the user equipment and information including content identifier information for identifying content, by receiving the content marker information via the IMS part;
a content marker information storing processing unit configured to execute a process of causing the user profile server functions part or the service control functions part to store the accepted content marker information;
a sharing-user identifier information accepting unit configured to accept sharing-user identifier information, which is information transmitted by the user equipment and information for identifying a user/users who shares/share the stored content marker information, by receiving the sharing-user identifier information via the IMS part;
a sharing-user identifier information storing processing unit configured to execute the process of causing the storing device to store the accepted sharing-user identifier information and user identifier information for identifying a user of user equipment having transmitted the sharing-user identifier information in association with each other;
a content marker output request accepting unit configured to accept a content marker output request, which is information transmitted by the user equipment and information including user identifier information for identifying a user and requesting for an output of content marker information, by receiving the content marker output request via the IMS part;
a content marker outputting unit configured to, based on the user identifier information included in the accepted content marker output request and the accepted sharing-user identifier information, extract content marker information corresponding to the user identifier information from the stored content marker information, and output the extracted content marker information; and
a content marker transmitting unit configured to transmit the outputted content marker information to the user equipment having transmitted the content marker output request via the IMS part;
the content marker information accepting unit is configured to accept sharing permission information representing whether to permit sharing of content marker information with another user, the content marker information, and user identifier information for identifying a user of user equipment having transmitted the content marker information;
the content marker information storing processing unit is configured to execute a process of, in a case that the accepted sharing permission information represents sharing of content marker information with another user is not permitted, causing the storing device to store the accepted content marker information and the user identifier information in association with each other, whereas, in a case that the sharing permission information represents sharing of content marker information with another user is permitted, causing the storing device to store the accepted content marker information, the user identifier information and sharing-user identifier information stored in association with the user identifier information, in association with one another; and the content marker outputting unit is configured to extract content marker information stored in association with user identifier information or sharing-user identifier information identical to the user identifier information included in the accepted content marker output request, and output the extracted content marker information.

3. A content delivery method, comprising:

accepting content marker information including content identifier information for identifying content;

executing a process of causing a storing device to store the accepted content marker information;

accepting sharing-user identifier information for identifying a user/users who shares/share the stored content marker information;

executing the process of causing the storing device to store the accepted sharing-user identifier information and user identifier information for identifying a user of user equipment having transmitted the sharing-user identifier information in association with each other;

accepting a content marker output request including user identifier information for identifying a user and requesting for an output of content marker information; and based on the user identifier information included in the accepted content marker output request and the accepted sharing-user identifier information, extracting content marker information corresponding to the user identifier information from the stored content marker information, and outputting the extracted content marker information;

accepting sharing permission information representing whether to permit sharing of content marker information with another user, the content marker information, and user identifier information for identifying a user of user equipment having transmitted the content marker information;

executing a process of causing the storing device to store the accepted content marker information and the user identifier information in association with each other and, in a case that the accepted sharing permission information represents permission of sharing of content marker information with another user, further causing the storing device to store user identifier information being identified by the sharing-user identifier information stored in association with the user identifier information, and the content marker information in association with each other; and extracting the content marker information stored in association with the user identifier information identical to the user identifier information included in the accepted content marker output request, and outputting the extracted content marker information.

4. A content delivery method, comprising:

accepting content marker information including content identifier information for identifying content;

executing a process of causing a storing device to store the accepted content marker information;

accepting sharing-user identifier information for identifying a user/users who shares/share the stored content marker information;

executing a process of causing the storing device to store the accepted sharing-user identifier information and user identifier information for identifying a user of user equipment having transmitted the sharing-user identifier information in association with each other;

accepting a content marker output request including user identifier information for identifying a user and requesting for an output of content marker information; and based on the user identifier information included in the accepted content marker output request and the accepted sharing-user identifier information, extracting content marker information corresponding to the user identifier information from the stored content marker information, and outputting the extracted content marker information;

accepting sharing permission information representing whether to permit sharing of content marker information with another user, the content marker information, and user identifier information for identifying a user of user equipment having transmitted the content marker information;

executing a process of, in a case that the accepted sharing permission information represents sharing of content marker information with another user is not permitted, causing the storing device to store the accepted content marker information and the user identifier information in association with each other, whereas, in a case that the sharing permission information represents sharing of content marker information with another user is permitted, causing the storing device to store the accepted content marker information, the user identifier information and sharing-user identifier information stored in association with the user identifier information, in association with one another; and extracting content marker information stored in association with user identifier information or sharing-user identifier information identical to the user identifier information included in the accepted content marker output request, and outputting the extracted content marker information.

* * * * *